(12) United States Patent
Chen et al.

(10) Patent No.: US 12,449,044 B2
(45) Date of Patent: Oct. 21, 2025

(54) ELECTRIC BALL VALVE AND METHOD FOR MANUFACTURING ELECTRIC VALVE

(71) Applicant: ZHEJIANG SANHUA AUTOMOTIVE COMPONENTS CO., LTD., Zhejiang (CN)

(72) Inventors: Haitao Chen, Zhejiang (CN); Qikai Bian, Zhejiang (CN); Junjie Yang, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 241 days.

(21) Appl. No.: 18/011,606

(22) PCT Filed: Jun. 23, 2021

(86) PCT No.: PCT/CN2021/101690
§ 371 (c)(1),
(2) Date: Dec. 20, 2022

(87) PCT Pub. No.: WO2021/259297
PCT Pub. Date: Dec. 30, 2021

(65) Prior Publication Data
US 2023/0279955 A1    Sep. 7, 2023

(30) Foreign Application Priority Data

Jun. 24, 2020   (CN) .......................... 202010586609.7
Jun. 24, 2020   (CN) .......................... 202010586614.8
(Continued)

(51) Int. Cl.
*F16K 31/06*   (2006.01)
*F16K 5/06*    (2006.01)
(Continued)

(52) U.S. Cl.
CPC .......... *F16K 5/0647* (2013.01); *F16K 27/067* (2013.01); *F16K 31/0644* (2013.01);
(Continued)

(58) Field of Classification Search
CPC .... F16K 31/535; F16K 5/0647; F16K 27/067; F16K 31/0603; F16K 31/0675; F16K 31/105; F16K 37/0033
See application file for complete search history.

(56) References Cited

U.S. PATENT DOCUMENTS 3,257,094 A * 6/1966 Vischer, Jr. ........... F16K 31/043
                                                    251/170
6,756,780 B2   6/2004 Hagio et al.
(Continued)

FOREIGN PATENT DOCUMENTS

CN   202756654 U   2/2013
CN   109253283 A   1/2019
(Continued)

OTHER PUBLICATIONS

International Search Report dated Sep. 26, 2021 for PCT Appl. No. PCT/CN2021/101690.
(Continued)

*Primary Examiner* — Angelisa L. Hicks
(74) *Attorney, Agent, or Firm* — Ohlandt, Greeley and Perle, L.L.P.

(57) ABSTRACT

An electric ball valve, comprising: a shaft portion, a magnetic ring, and a Hall sensor, the Hall sensor being in electrical and signal connection with a circuit board, the shaft portion being connected to an output shaft and capable of rotating along with the output shaft, the magnetic ring being sleeved on the radial periphery of the shaft portion, and the magnetic ring being capable of rotating along with the shaft portion; and a cushioning portion, the cushioning
(Continued)

portion directly or indirectly abutting against an end of the shaft portion. Also provided is a method for manufacturing an electric valve. The present electric ball valve is provided with the cushioning portion at the end of the shaft portion, thereby facilitating reducing downward plays of the magnetic ring and the shaft portion in the axial direction during rotation along with the output shaft.

16 Claims, 15 Drawing Sheets

(30) Foreign Application Priority Data

Jun. 24, 2020 (CN) .......................... 202010587932.6
Jun. 24, 2020 (CN) .......................... 202021205527.5

(51) Int. Cl.
  *F16K 27/06* (2006.01)
  *F16K 31/10* (2006.01)
  *F16K 37/00* (2006.01)
(52) U.S. Cl.
  CPC ........ *F16K 31/0675* (2013.01); *F16K 31/105* (2013.01); *F16K 37/0033* (2013.01)

(56) References Cited

U.S. PATENT DOCUMENTS

| 2004/0183386 A1* | 9/2004 | Kuwert | ................... H02K 5/225 310/71 |
| 2020/0109788 A1 | 4/2020 | Ikemoto | |
| 2021/0025506 A1 | 1/2021 | Yan et al. | |

FOREIGN PATENT DOCUMENTS

| CN | 208442316 U | | 1/2019 | |
| CN | 103574153 A | | 1/2020 | |
| CN | 110725985 A | * | 1/2020 | ............. A45D 34/04 |
| EP | 3480502 A1 | | 5/2019 | |
| JP | 6145180 A | | 3/1986 | |
| WO | WO-2021209723 A1 | * | 10/2021 | ............... F16H 1/28 |

OTHER PUBLICATIONS

1 European Search Report dated Jun. 26, 2024 for European Application No. 21828065.9.

* cited by examiner

ELECTRIC BALL VALVE AND METHOD FOR MANUFACTURING ELECTRIC VALVE

This application is a National Phase entry of PCT Application No. PCT/CN2021/101690, filed on Jun. 23, 2021, which claims the priorities to the following four Chinese patent applications, all of which are incorporated in their entireties herein by reference, 1) Chinese Patent Application No. 202010586609.7, titled "ELECTRIC BALL VALVE", filed with the China National Intellectual Property Administration on Jun. 24, 2020; 2) Chinese Patent Application No. 202010587932.6, titled "METHOD FOR MANUFACTURING ELECTRIC VALVE", filed with the China National Intellectual Property Administration on Jun. 24, 2020; 3) Chinese Patent Application No. 202010586614.8, titled "ELECTRIC BALL VALVE", filed with the China National Intellectual Property Administration on Jun. 24, 2020; 4) Chinese Patent Application No. 202021205527.5, titled "ELECTRIC VALVE", filed with the China National Intellectual Property Administration on Jun. 24, 2020.

FIELD

The present application relates to a flow control valve, and in particular to an electric ball valve and a method for manufacturing the electric ball valve.

BACKGROUND

An electric ball valve includes a control device, a valve core and a valve body assembly. The control device includes a driving part and a transmission part, and the transmission part may be a planetary gear structure. The driving part drives the valve core ball of the electric ball valve to move through the transmission parts, so as to achieve the purpose of switching or opening and closing the flow channel of the fluid. In order to improve the control accuracy of the electric ball valve, a Hall sensor and a magnetic ring are generally set on the electric ball valve as the detection device. The following are some technical problems to be improved: firstly, how to set the Hall sensor and the magnetic ring on the electric ball valve to ensure the control accuracy of the electric ball valve, secondly, as the electric ball valve includes many parts, how to make rational use of space to make the structure of electric ball valve as compact as possible, and optimize the method of manufacturing the electric ball valve to reduce the production cost and maintenance cost, thirdly, how to reduce the electromagnetic interference of the electric ball valve.

SUMMARY

An object of the present application is to provide an electric ball valve and a method for manufacturing the electric ball valve, which is beneficial to improve the control precision of the electric ball valve.

To achieve the above object, the following technical solutions are provided in the present disclosure.

An electric ball valve includes a driving part, a transmission part, a valve core ball and a valve body. The valve core ball is accommodated in an inner cavity formed by the valve body. The valve core ball has an inner channel. The driving part is in transmission connection with the transmission part. The valve body is provided with at least two flow channels for communicating with the outside. The transmission part drives the valve core ball to move, so that the inner channel of the valve core ball communicate or not communicate with the flow channel or selectively communicate or not communicate with one of the flow channels. The electric ball valve includes a magnetic ring and a Hall sensor. The driving part includes a rotor assembly, and the rotor assembly includes a shaft part. The transmission part includes an output shaft, and the shaft part is in transmission connection with the output shaft. The magnetic ring is mounted outside a radial outer circumference of the shaft part, and the electric ball valve further includes a buffer part. The buffer part and an end of the shaft part are in direct or indirect contact.

According to the electric ball valve of the present application, by arranging the buffer part at the end of the shaft part, it is beneficial to reduce an axial downward movement of the magnetic ring and the shaft part in the process of following the rotation of the output shaft, so as to improve the detection accuracy and stability of the detection assembly and the control accuracy of the electric ball valve.

A method for manufacturing an electric valve, including the following steps:

the assembly of the first part, including the matching and assemble of the stator assembly and the control part, that is, the assembled stator assembly is pressed into the casing of the control part, and the stator assembly and the casing are connected as a whole through screw connection, a circuit board is placed in the casing and crimped with the pins of the casing and the pins of the stator assembly, the circuit board is connected with the casing through threaded connection, and the upper cover is hermetically connected with the casing;

the assembly of the second part, including the matching and assemble of the rotor assembly and the transmission part;

the assembly of the third part, including the matching and assemble of the second part with the valve body assembly and the valve core, specifically, the valve body assembly and the valve core are assembled, the second part is connected with the valve core and the second part is fixedly connected with the valve body assembly;

the first part is in screw connection with the third part.

According to the above manufacturing method, the stator assembly and the control part are assembled to obtain the first part, the rotor assembly and the transmission part are assembled to obtain the second part, and then the second part is assembled with the valve body assembly and the valve core to obtain the third part. The first part and the third part are connected by threads, and the first part and the second part can be assembled separately, which is beneficial to optimizing the assembly process and reducing the production cost.

DETAILED DESCRIPTION OF THE EMBODIMENTS

Figure 1:
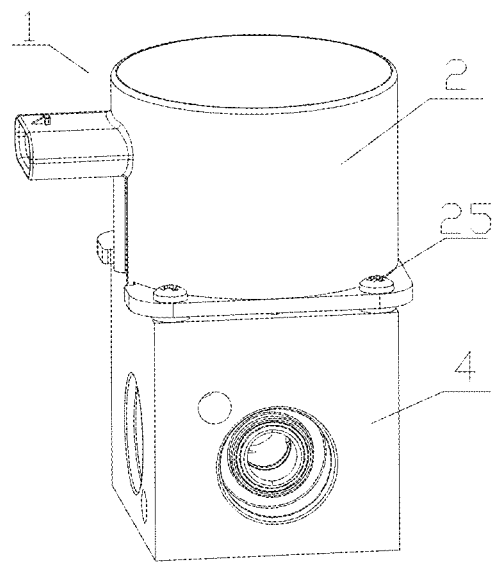
FIG. 1 is a schematic three-dimensional structure diagram of an embodiment of an electric valve.

The present application is further illustrated hereinafter in conjunction with drawings and specific embodiments.

Referring to FIG. 1 to FIG. 20, according to an embodiment of an electric valve of the present application, the electric valve may be applied to the thermal management system of the vehicle. The electric valve may include an electric ball valve, an electronic expansion valve, etc. In this embodiment, the electric valve is specifically an electric ball valve. The electric ball valve 1 includes a control device 2, a valve core and a valve body assembly 4. The valve core is specifically a valve core ball 3 in this embodiment. The valve body assembly 4 includes a valve body 41, the valve core ball 3 is accommodated in an inner cavity formed by the valve body 41, and the control device 2 is fixedly connected with the valve body 41. The control device 2 includes a driving part 20, a transmission part 23, and a control part 24. In this embodiment, the driving part 20 includes a rotor assembly 21 and a stator assembly 22. Of course, the driving part 20 may also be in other forms for outputting torque to the transmission part; the stator assembly 22 is located on an outer periphery of the rotor assembly 21, and the stator assembly 22 has a first accommodating cavity 229. At least part of the rotor assembly 21 is located in the first accommodating cavity 229. The rotor assembly 21 has a transmission part accommodating part 2110, and at least part of the transmission part 23 is located in the transmission part accommodating part 2110 of the rotor assembly 21. The transmission part 23 includes a valve rod 231, and the valve rod 231 is connected with the valve core ball 3. The control part 24 includes a circuit board 241 that is in electric and/or signal connection to the stator assembly 22. As other implementations, the circuit board may be located outside the electric valve. Further, the valve core ball 3 is provided with an inner channel 31, and the valve body 41 is provided with at least two flow channels 411 for communicating with the outside. The circuit board 241 controls the stator assembly 22 to generate an exciting magnetic field, and the rotor assembly 21 rotates and outputs torque under the action of the exciting magnetic field, and the torque is transmitted to the valve rod 231 through the transmission part 23. The valve rod 231 drives the valve core ball 3 to rotate, so that the inner channel 31 of the valve core ball 3 communicates or does not communicate with the flow channel 411 or selectively communicates or does not communicate with one of the flow channels, thereby opening or closing or switching the flow path of the electric ball valve or controlling the flow rate of the flow path.

Referring to FIGS. 4, 8, 9 and 10, the stator assembly 22 includes a coil winding 221, a stator casing 222 and a skeleton 220. The skeleton 220 includes a claw pole plate 223, a first pin 224 and an injection part 225. The claw pole plate 223, the first pin 224 and other metal pieces are used as injection inserts to form the skeleton 220. The coil winding 221 is located on the outer circumference of the claw pole plate 223, and the coil winding 221 is wound around the outer circumference of the skeleton 220. The stator casing 222 is connected with the skeleton 220, and the coil windings 221 and the claw pole plates 223 are both located inside the stator casing 222. The stator assembly 22 is assembled into an integral piece. The first pin 224 is partially encapsulated in the injection part 225, and one end of the first pin 224 is electrically and/or signally connected to the coil winding 221. The other end of the first pin 224 extends out of the injection part 225 and can be fixed with the circuit board 241 by crimping or welding, so that the stator assembly 22 is electrically and/or signal connected with the circuit board 241 through the first pin 224.

Referring to FIG. 1 to FIG. 7, the control part 24 further includes a casing 242 and an upper cover 243. The casing 242 is sealingly connected with the upper cover 243. The casing 242 is integrally formed by injection molding, the casing 242 has a control cavity 2421, and the stator assembly 22 and the circuit board 241 are located in the control cavity 2421. The casing 242 includes a bottom portion 2422 and a side portion 2423, and the side portion 2423 is cylindrical. The side portion 2423 is substantially perpendicular to the bottom portion 2422, and the upper cover 243 is connected to the side portion 2423. The bottom portion 2422 has a first through hole 24221, and the first through hole 24221 is located within the inner circumference of the side portion 2423. The diameter of the first through hole 24221 is larger than the outer diameter of the rotor assembly 21, so that at least part of the rotor assembly 21 can pass through the first through hole 24221. The diameter of the first through hole 24221 is smaller than the outer diameter of the stator assembly 22, which can limit the lower end face of the stator assembly and prevent the stator assembly from being separated from the control cavity 2421 at the first through hole 24221. A first communication hole 24222 is further defined on the bottom portion 2422, and the side wall forming the first communication hole 24222 may or may not be provided with threads. The first communication hole 24222 is located outside the outer circumference of the side portion 2423, and the valve body 41 is also provided with a screw hole corresponding to the first communication hole 24222. Referring to FIG. 1, the electric ball valve includes a first screw 25 through which the casing 242 and the valve body 41 can be connected. In order to make the connection between the casing 242 and the valve body 41 more uniform and firm, the number of the first communication holes 24222 in this embodiment is four, and correspondingly, a screw hole is arranged at the four corners of the valve body 41 and fixed by the first screw 25. The casing also has a positioning rib 24231, and the positioning rib 24231 is located on the side inner wall 24232. The positioning rib 24231 protrudes from the side inner wall 24232 toward the center of the control cavity 2421. The positioning rib 24231 extends from the upper end of the bottom portion 2422 to the upper end of the side inner wall 24232 along the axial direction. Adjacent positioning ribs 24231 are separated by a certain distance and defined along the circumferential direction of the side inner wall 24232. The lower end face of the stator assembly 22 is in contact with the bottom portion 2422, and the stator assembly 22 is in an interference fit with the positioning ribs 24231. The outer peripheral wall of the stator assembly 22 abuts against the positioning ribs 24231, and the stator assembly 22 is circumferentially positioned through the positioning ribs 24231. The side portion 2423 is further provided multiple second communication holes 24233, and the side walls forming the second communication holes 24233 may or may not be provided with threads. The second communication hole 24233 is located at the upper end of the side inner wall 24232, the second communication holes are defined along the inner circumference of the side portion 2423. The adjacent second communication holes 24233 are located at the same level, and the second communication holes 24233 are opened along the axial direction. The electric ball valve further includes a second screw 26, and the upper end of the stator assembly 22 is provided with a connecting hole 228 corresponding to the second communication hole 24233. The second screw 26 passes through the connecting hole 228 of the stator assembly 22 and extends into the second communication hole 24233, and is tightened. The stator assembly 22 can be connected to the casing 242 in the axial direction by means of the second screws 26. In this embodiment, the number of the second screws is 4, and the number of the corresponding connecting holes 228 is also 4. The four second communication holes 24233 are evenly defined along the circumference of the side inner wall, which may better connect the stator assembly 22 and the casing 242. Of course, the number of the second screws 26 and the second communication holes 24233 may also be appropriately increased or decreased. It can be understood that, as other implementations, other detachable connections, such as snap connections, may also be used to connect the stator assembly 22 and the casing 242 in the axial direction, and are not limited to threaded connections.

The casing 242 further includes an interface portion 2424, and the interface portion 2424 is located on the outer periphery of the side portion 2423. The interface portion 2424 is disposed close to the circuit board 241, and the interface portion 2424 has a third accommodating cavity 24242 which is separated from and not in communication with the control cavity 2421. The control device 2 further includes a second pin 24241, and part of the second pin 24241 is fixed to the casing 242 by injection molding. One end of the second pin 24241 is located in the control cavity 2421, and the second pin 24241 may be in electric and/or signal connection with the circuit board 241 by crimping or welding. The other end of the second pin 24241 is located in the third accommodating cavity 24242 for being in electric and/or signal connection with the outside. The electric connection and/or signal connection between the circuit board 241 and the outside may be realized through the interface portion 2424.

Figure 6:
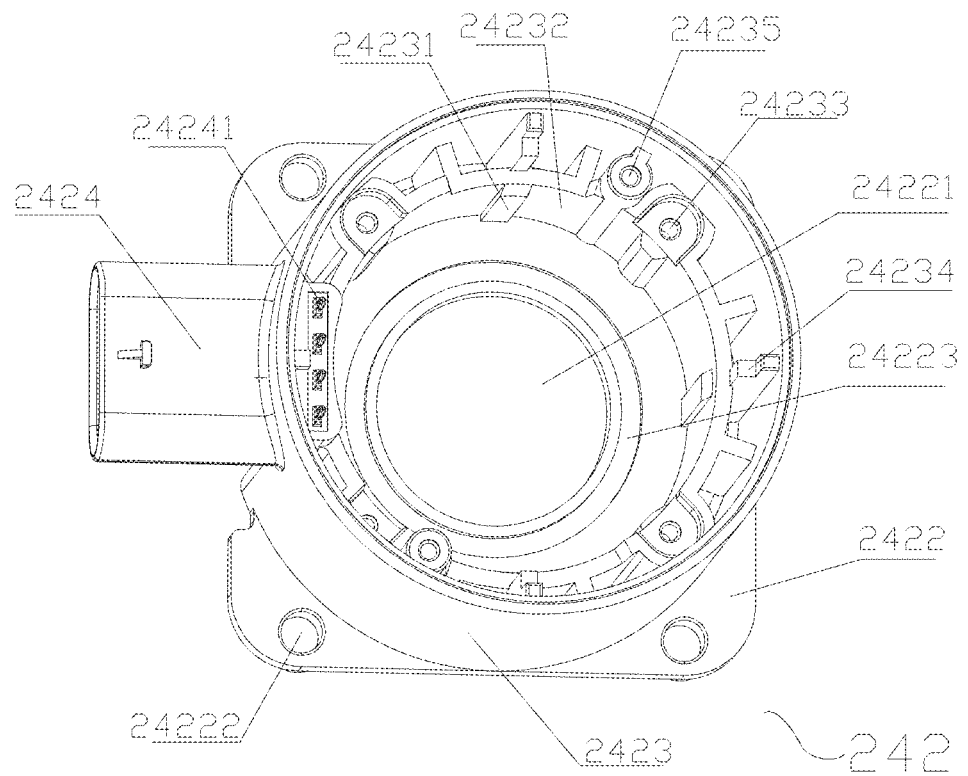
FIG. 6 is a perspective view of the casing of the control part in FIG. 5.
Figure 7:
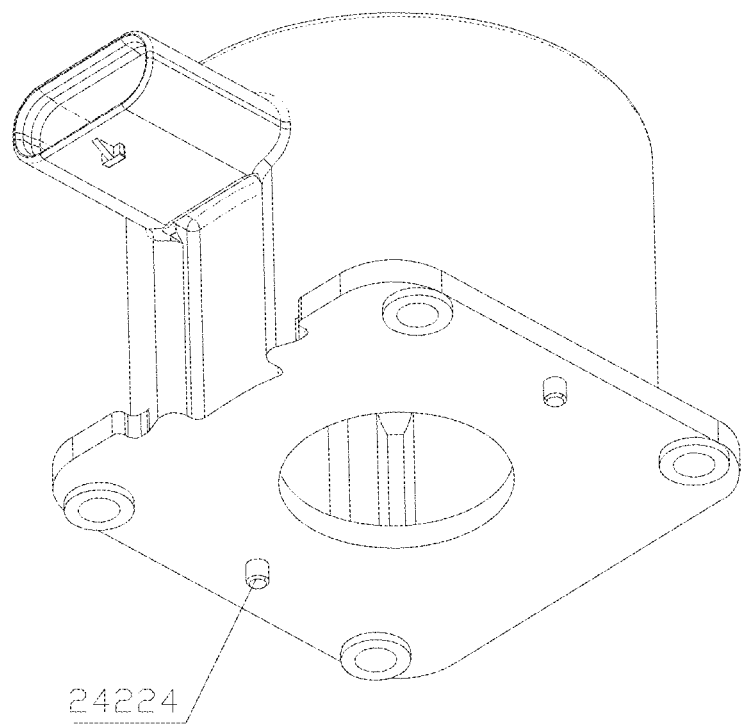
FIG. 7 is another perspective view of the casing of the control part in FIG. 5.
Figure 8:
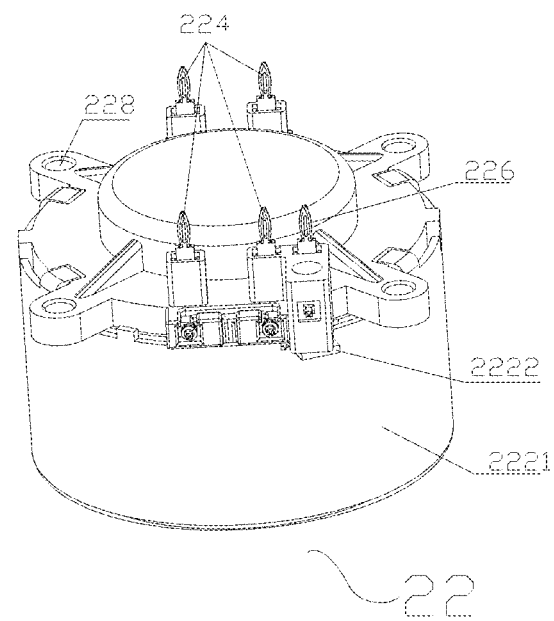
FIG. 8 is a schematic three-dimensional structure diagram of the stator assembly in FIG. 5.
Figure 9:
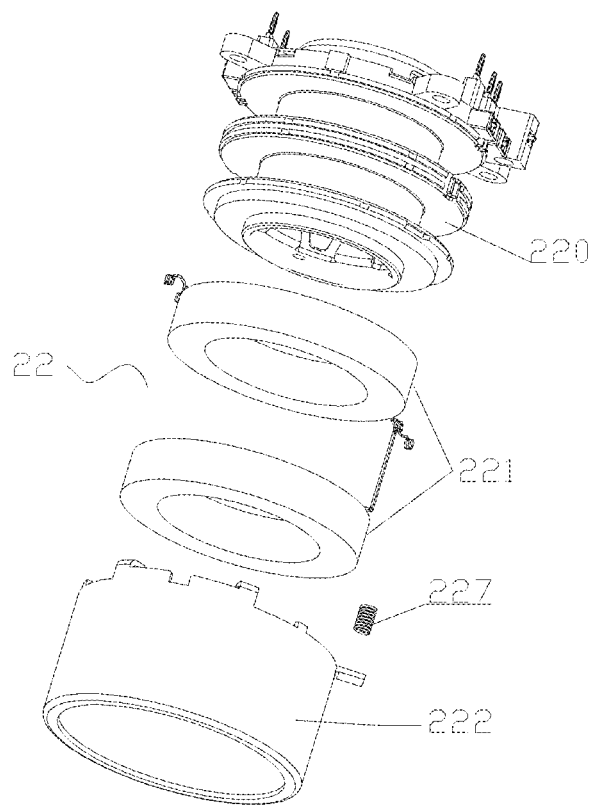
FIG. 9 is an exploded structure schematic diagram of the stator assembly of FIG. 8.
Figure 10:
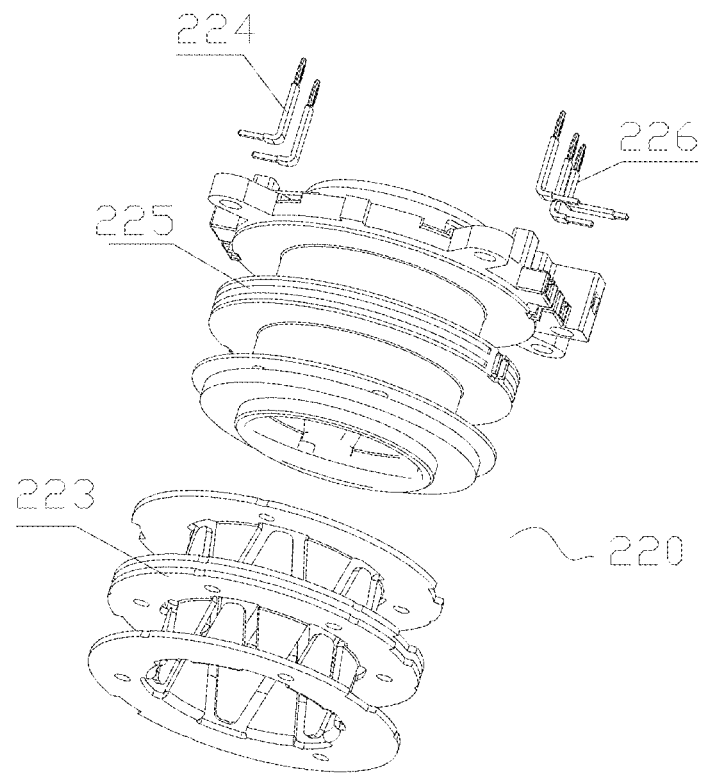
FIG. 10 is an exploded structural diagram of the skeleton of FIG. 9.

A first step portion 24234 is further provided at the side portion 2423 of the casing 242, and the first step portion 24234 is located on the inner circumference of the side portion. Viewed from the direction shown in FIG. 4, the first step portion 24234 is located above the injection part 225 of the stator assembly 22. The first step portion 24234 is closer to the upper cover 243 than the injection part 225 of the stator assembly 22. The circuit board 241 abuts against the first step portion 24234, and the first step portion 24234 plays a role in limiting and supporting the circuit board 241. Referring to FIG. 6, the side portion 2423 further includes multiple third communication holes 24235, and the third communication holes 24235 are also defined along the inner circumference of the side portion 2423. The adjacent third communication holes 24235 are located at the same level, and the third communication holes 24235 are opened along the axial direction. The third communication hole 24235 is closer to the upper cover 243 than the second communication hole 24233. The electric ball valve 1 further includes a third screw 27, and the circuit board 241 is provided with a connecting hole corresponding to the third communication hole 24235. The third screw 27 passes through the connecting hole of the circuit board 241, extends into the third communication hole 24235, and then is tightened. The first pin 224 and the second pin 24241 are crimped or welded with the circuit board 241. In this embodiment, the ends of the first pin 224 and the second pin 24241 are shaped like fish tails, and can be connected with the circuit board 241 by crimping, which is convenient for disassembly. The circuit board 241 and the casing 242 can be connected by the third screw 27. In this embodiment, the number of the third screw 27 is at least two. At least two third screw 27 may prevent the circuit board 241 from rotating in the circumferential direction. Similarly, the connection between the circuit board 241 and the casing 242 may also adopt other detachable connections, such as snap connection, and is not limited to screw connection. The stator assembly 22 and the circuit board 241 are connected with the casing 242 in a detachable manner. Compared with the original two-step injection molding process of the stator assembly and the casing, the manufacturing process is simplified, the manufacturing cost is reduced, the risk of enameled wire breakage during the two-step injection molding is reduced, and the maintenance cost is also reduced. Referring to FIG. 7, there are two positioning posts 24224 at one end of the bottom portion 2422 of the casing close to the valve body 41, and the corresponding valve body 41 is provided with a positioning portion. When assembling, the positioning post 24224 is configured to cooperate with the positioning portion, which can play the function of positioning and error prevention.

In order to strengthen the sealing of the electric ball valve and reduce moisture or dust entering the cavity where the circuit board 241 and the coil winding 221 are located, that is, the control cavity 2421 and further affecting the normal operation of the circuit board 241 and the stator assembly 22, a first sealing ring 244 is further provided on the control device 2, which is located between the bottom portion 2422 of the casing 242 and the stator assembly 22. The bottom portion 2422 of the casing 242 defines a first sealing installation groove 24223, and the first sealing ring 244 is located in the first sealing installation groove 24223. An upper end of the first sealing ring 244 is in hermetically connected with a lower end surface of the stator assembly 22. The first sealing ring 244 and the injection part 225 of the stator assembly 22 help to reduce moisture from entering the control cavity 2421 through the connection part of the casing 242 and the stator assembly 22.

In addition, referring to FIG. 8 to FIG. 12, the electric ball valve 1 further includes a third pin 226 and a connecting piece 227, and the material of the connecting piece 227 is a metal conductive material. Through the connecting piece 227, the stator casing 222 is conductively connected to the third pin 226, and the third pin 226 is crimped to the circuit board 241 and is conductively connected to the ground layer of the circuit board 241. The end of the third pin 226 is also in the shape of a fish tail, and is connected with the circuit board 241 by crimping, which is convenient for disassembly. In this technical solution, the conductive connection refers to the conductive connection between two elements, and the mechanical connection can be fixed connection or detachable connection. The stator casing 222 includes a mating part 2222 and a stator casing main body 2221, and the mating part 2222 is fixedly connected or integrally connected with the stator casing main body 2221 and can be electrically connected. The mating part 2222 is located on the outer periphery of the stator casing main body 2221. One end of the connecting piece 227 is in contact with the mating part 2222 and is electrically connected, and the other end of the connecting piece 227 abuts and is electrically connected with the third pin 226. Both the third pin 226 and the first pin 224 are used as inserts to be integrated with the claw pole plate 223 by injection molding. Part of the third pin 226 extends out of the injection part 225, and the stator assembly 22 is also formed with a mounting part 2251 by injection molding. Part of the third pin 226 is located in the mounting part 2251, specifically, the part of the third pin 226 is located in the middle or upper part of the mounting part 2251. The connecting piece 227 is inserted from the lower end of the mounting part 2251 and abuts against the third pin 226, and the stator casing 222 is assembled and fixed, then the mounting part 2251 is connected with the mating part 2222. The mating part 2222 is in contact with the lower end of the connecting piece 227. The mounting part 2251 may limit the movement of the connecting piece 227 along the stator casing 222, and limit the movement of the connecting piece 227 in the axial direction through the third pin 226 and the mating part 2222. The movement limit here means that the movement in a certain direction is within a certain distance. Taking the direction shown in FIG. 12 of this embodiment as an example, the horizontal movement of the connecting piece 227 is limited by the size of the mounting part 2251, and the movement of the connecting piece cannot exceed the limited range of the mounting part 2251. Through the connecting piece 227 and the third pin 226, the stator casing 222 and the circuit board 241 can be conductively connected. When there is external electromagnetic interference, the electromagnetic force acting on the surface of the stator casing 222 can be guided from the connecting piece 227 and the third pin 226 to the grounding layer of the circuit board 241, and then connected to the grounding terminal through the grounding layer to realize the grounding function. This is beneficial to reduce the interference of the electromagnetic gathered in the stator assembly 22 to the circuit board 241 and the electrical elements connected with the circuit board 241. Specifically, in this embodiment, the connecting piece 227 is a spring, and the spring has elasticity. The third pin 226 is elastically connected with the stator casing 222 through a spring, which plays a buffering role, and may offset part of the stress when the electric ball valve vibrates, which is beneficial to prolonging the service life of the electric ball valve. In addition, in this technical solution, the stator casing 222 and the third pin 226 are connected by the connecting piece 227, which may reduce the welding steps and reduce the production cost. Of course, the mating part may also be set on the inner circumference of the stator casing main body, or no additional mating part is provided, and the same function can be achieved by changing the structure of the connecting piece. It can be understood that if it is only to reduce the interference of external electromagnetics to the electric ball valve, other parts of the stator assembly such as the skeleton, the claw pole plate, the coil winding, etc. can be adjusted to a certain extent, and it is not limited to the method given in this embodiment. For example, the stator assembly and the casing may also be integrally formed by the secondary injection molding process, and the entire stator assembly and the casing may be injection-molded into one body. After injection molding, the stator casing is still electrically connected to the circuit board through the connecting piece and the third pin.

Figure 13:
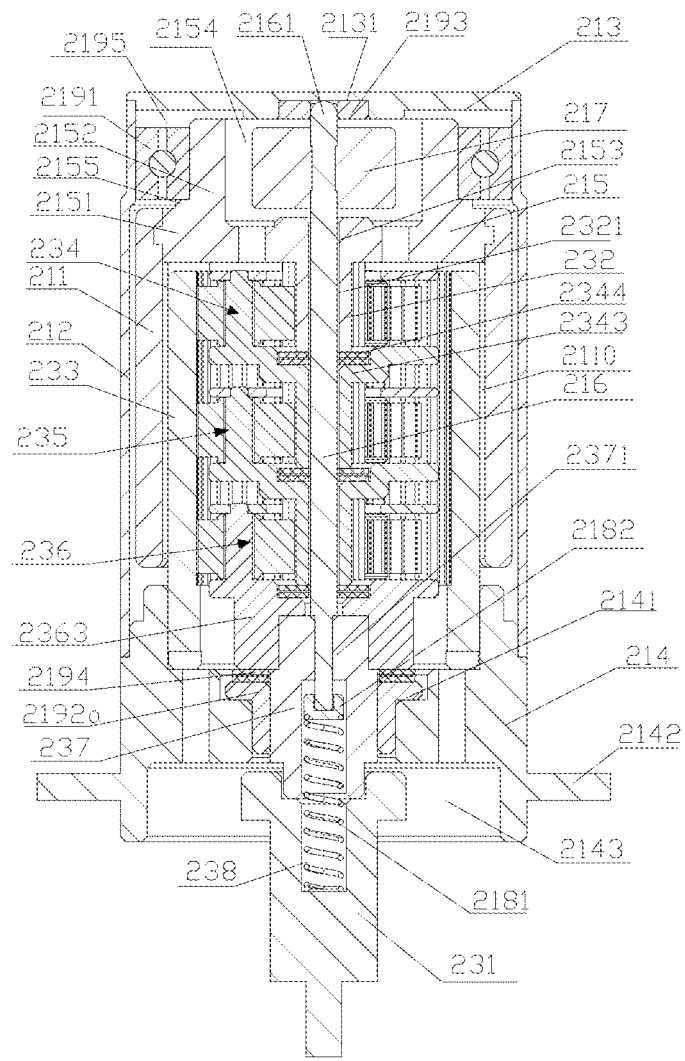
FIG. 13 is another cross-sectional structural diagram of the rotor assembly and the transmission part of the control device in FIG. 2.

Referring to FIG. 13, the rotor assembly 21 includes a rotor 211, a connecting bracket 215 and a shaft part 216. The rotor 211 is a magnetic rotor and contains permanent magnet material. The shaft part 216 forms the central axis of the rotor assembly 21, the connecting bracket 215 is connected with the rotor 211, and the connecting bracket 215 is in clearance fit with the shaft part 216. The rotor assembly 21 further includes an isolation sleeve and a connecting seat 214. The isolation sleeve includes a sleeve 212 and an end cover 213. The sleeve 212 is located on the radial outer circumference of the rotor 211. One end of the sleeve 212 is fixedly connected to the end cover 213 by welding, and the other end of the sleeve 212 is fixedly connected to the connecting seat 214 by welding. The rotor 211, the connecting bracket 215, the shaft part 216 and at least part of the transmission part 23 are located in the space formed by the end cover 213, the sleeve 212 and the connecting seat 214. The rotor assembly 21 is connected to the valve body 41 through the connecting seat 214 in a limited position.

Figure 14:
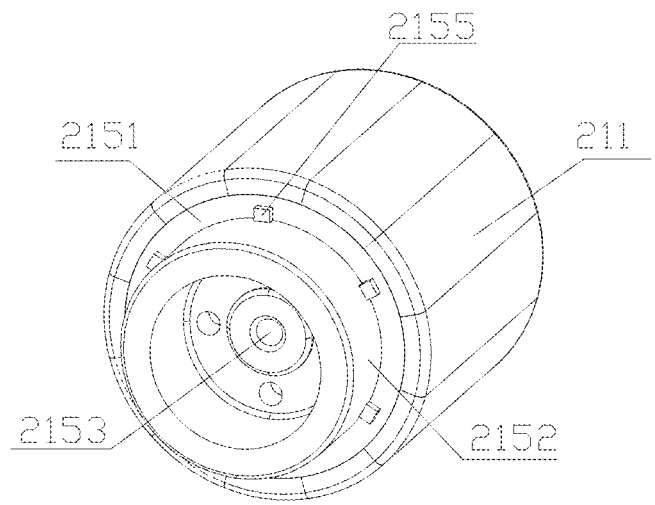
FIG. 14 is a perspective view of the rotor, the connecting bracket and the sun gear at an angle.
Figure 15:
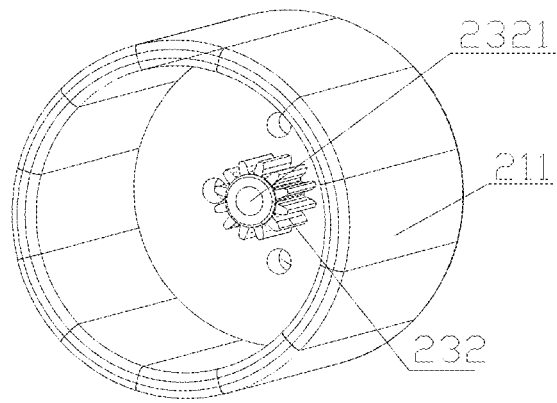
FIG. 15 is a perspective view of the rotor, the connecting bracket and the sun gear at another angle.

As shown in FIG. 13 to FIG. 15, the connecting bracket 215 includes a connecting part 2151. The connecting bracket 215 is connected to the rotor 211 as a whole through the connecting part 2151. Specifically, the rotor 211 and the connecting bracket 215 can be integrally molded into a whole. Or the rotor 211 and the connecting bracket 215 are respectively injection-molded and then fixedly connected as a whole. Or the rotor 211 and the connecting bracket 215 are fixedly connected as a whole. The connecting bracket 215 further includes a first flange part 2152, the first flange part 2152 protrudes along the axial direction, the first flange part 2152 is located on the upper portion of the connecting part 2151. Specifically, the free end of the first flange part 2152 is disposed close to the end cover 213, and the fixed end of the first flange part 2152 is fixedly connected or integrally formed with the connecting part 2151. One end of the shaft part 216 abuts against the end cover 213, and this end is the first end 2161. The end of the first end 2161 has an arc and is hemispherical, which may reduce the frictional force between the shaft part 216 and the end cover 213 when the shaft part 216 rotates. The connecting bracket 215 further includes protrusions 2155, and the protrusions 2155 are evenly defined on the outer circumference of the first flange part 2152.

The transmission part 23 includes a deceleration mechanism, and the deceleration mechanism is a planetary gear deceleration mechanism. Of course, as other embodiments, the deceleration mechanism may be other forms of transmission deceleration mechanism. The deceleration mechanism includes a sun gear 232 and a planetary gear assembly, and the sun gear 232 is fixedly connected with the connecting bracket 215. In this embodiment, referring to FIG. 14 and FIG. 15, the sun gear 232 is connected with the connecting bracket 215 and the rotor 211 to form an integral piece through injection molding, and the integral piece is the first assembly. The first assembly includes the sun gear 232, the connecting bracket 215 and the rotor 211. The sun gear 232 is located at the lower end of the connecting bracket 215 and extends in the axial direction. The first assembly has a shaft guide part, and the shaft guide part plays a guiding and positioning role for the shaft part 216. The shaft guide part includes a first guide part 2153 and a second guide part 2321. The first guide part 2153 is located inside the connecting bracket 215, and the inner diameter of the first guide part 2153 is slightly larger than the outer diameter of the shaft part 216. The second guide part 2321 is located inside the sun gear 232, and the second guide part 2321 is coaxially arranged with the first guide part 2153. The inner diameter of the second guide part 2321 is slightly larger than the outer diameter of the shaft part 216, and the second guide part 2321 communicates with the first guide part 2153 of the connecting bracket 215. Part of the shaft part 216 is located at the first guide part 2153 and the second guide part 2321, and the shaft part 216 is in clearance fit with the connecting bracket 215 and the sun gear 232. The transmission part accommodating part 2110 is located on the inner circumference of the rotor 211 and is located at the lower end of the connecting part 2151. The sun gear 232 is located in the transmission part accommodating part 2110, and at least part of the planetary gear assembly is also located in the transmission part accommodating part 2110.

The reduction mechanism includes at least one planetary gear assembly, and the planetary gear assembly includes an output stage planetary gear assembly. When the transmission ratio is relatively low, it is possible to provide only one output stage planetary gear assembly. As the transmission ratio is required to be increased, in addition to the output stage planetary gear assembly, there can also be one or more sets of planetary gear assemblies. In this embodiment, the speed reduction mechanism includes three groups of planetary gear assemblies, which are listed as the first planetary gear assembly 234, the second planetary gear assembly 235, and the output stage planetary gear assembly 236 according to the distance from the sun gear 232. Herein, the planetary gear assembly farthest from the sun gear assembly is defined as the output stage planetary gear assembly 236.

The structures of the first planetary gear assembly 234 and the second planetary gear assembly 235 are the same. Herein, the first planetary gear assembly 234 is taken as an example, referring to FIG. 17 and FIG. 18, the first planetary gear assembly 234 includes a planetary gear 2341, a first mounting plate 2342 and a planetary carrier 2343. The planetary carrier 2343 includes a fixed shaft 23431, a column gear 23432 and a second mounting plate 23433. The fixed shaft 23431 is fixedly connected or integrally formed with one end surface of the second mounting plate 23433. The column gear 23432 is fixedly connected or integrally formed with the other end surface of the second mounting plate 23433. Specifically, the fixed shaft 23431, the column gear 23432, and the second mounting plate 23433 can be formed by injection molding to form the planetary carrier 2343. In other words, the planetary carrier is integrally formed by injection molding, and the fixed shaft 23431, the column gear 23432 and the second mounting plate 23433 are integrally formed by injection molding. The fixed shaft 23431 is arranged substantially perpendicular to the second mounting plate 23433, and is located on the circumference at a set distance from the centerline of the second mounting plate 23433. The number of the fixed shafts 23431 is the same as the number of the planetary gear 2341. In this embodiment, the number of the planetary gear 2341 is three. The column gear 23432 is coaxially arranged with the second mounting plate 23433, the column gear 23432 is substantially perpendicular to the second mounting plate 23433. The column gear 23432 has a second through hole 23434. The second through hole 23434 extends along the axial direction of the column gear, and correspondingly the second mounting plate 23433 connected to the column gear 23432 also has a third through hole 23435. The second through hole 23434 is basically coaxial with the third through hole 23435, and the two through holes have the same diameter and communicate with each other. The planetary gear 2341 is mounted on the outer periphery of the fixed shaft 23431, and the planetary gear 2341 is rotatably arranged between the first mounting plate 2342 and the second mounting plate 23433 through the fixed shaft. The first mounting plate 2342 has a central through hole 2342$a$. After the sun gear 232 passes through the central through hole 2342$a$ of the first mounting plate, the sun gear 232 is engaged with the inner sides of the three planetary gears 2341. It is defined here that one side of the planetary gear 2341 close to the central axis of the planetary gear assembly is the inner side, and the opposite side is the outer side. The shaft part 216 passes through the third through hole 23435 and the second through hole 23434, and is in clearance fit with the second mounting plate 23433 and the column gear 23432.

The first planetary gear assembly 234 may further include a first spacer 2344. The first spacer 2344 may be one spacer or a combination of two or more spacers, and of course, the first spacer may not be provided. In this embodiment, the first spacer 2344 includes an upper spacer 2344$a$ and a lower spacer 2344$b$. The upper and lower spacers are named according to their relative positions. The upper spacer 2344$a$ and the lower spacer 2344$b$ are arranged opposite to each other. The upper spacer 2344$a$ and the lower spacer 2344$b$ are located between the second mounting plate 23433 and one end surface of the sun gear 232. The second mounting plate 23433 of the planetary carrier has a mounting part 23436 recessed in the direction of the column gear 23432. The upper spacer 2344$a$ and the lower spacer 2344$b$ are located in the mounting part, which may reduce the wear of the second mounting plate 23433 when it rotates. The upper spacer 2344$a$ and the lower spacer 2344$b$ are also in clearance fit with the shaft part 216. In this embodiment, the upper spacer 2344$a$ and the lower spacer 2344$b$ are made of graphite material; of course, other materials may also be used.

Figure 19:
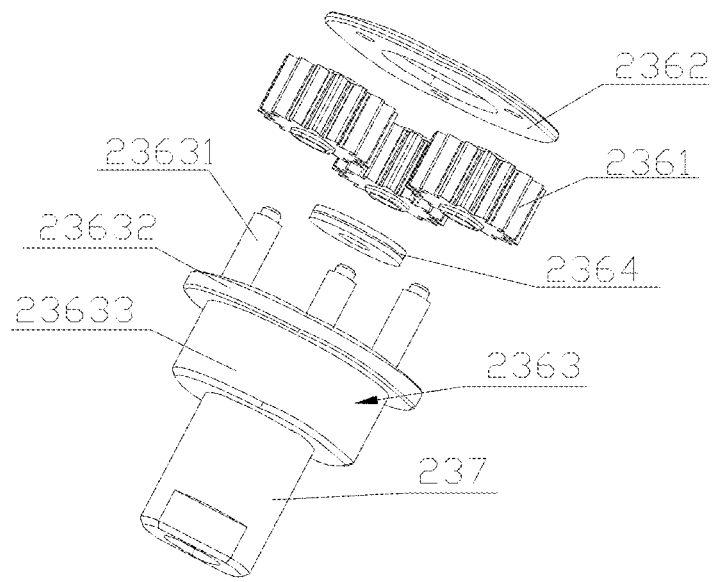
FIG. 19 is a schematic diagram of the exploded structure of an output stage planetary gear assembly and an output shaft in FIG. 13.
Figure 20:
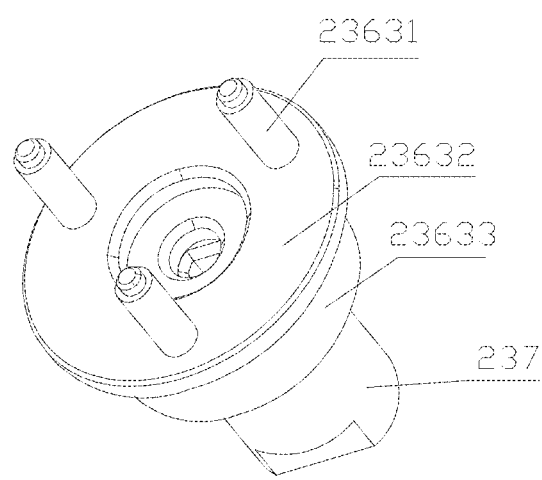
FIG. 20 is a perspective view of an angle of an output stage planetary carrier and an output shaft of the output stage planetary gear assembly in FIG. 19.

The output stage planetary gear assembly 236 includes a planetary gear 2361, a first mounting plate 2362, a spacer 2364 and a planetary carrier. Except that the structure of the planetary carrier is different from that of the first planetary gear assembly 234, the rest of the structure of the output stage planetary gear assembly is the same as that of the first planetary gear assembly. Herein, for the convenience of distinction, the planetary carrier of the output stage planetary gear assembly is denoted as the output stage planetary carrier 2363. As shown in FIG. 19 and FIG. 20, the output stage planetary carrier 2363 includes a fixed shaft 23631, a third mounting plate 23632 and a connecting part 23633. The fixed shaft 23631 and the third mounting plate 23632 are arranged substantially perpendicularly, and the fixed shaft 23631 is located on one end surface of the third mounting plate 23632 and is located at a circle with a set distance from the centerline of the third mounting plate 23632. The connecting part 23633 is located on the other end surface of the third mounting plate 23632, and the extending direction of the fixed shaft 23631 is opposite to the extending direction of the connecting part 23633. Unlike the planetary carrier 2343 of the first planetary gear assembly, the output stage planetary carrier 2363 does not have a column gear. The transmission part 23 further includes an output shaft 237, which is connected to or integrally formed with the output stage planetary carrier 2363. Specifically, one end of the output shaft 237 is connected to or integrally formed with the connecting part 23633.

The sun gear 232 passes through the central through hole 2342a of the first mounting plate of the first planetary gear assembly 234, and is engaged with the inner sides of the three planetary gears 2341 of the first planetary gear assembly 234. The lower end of the sun gear 232 is in contact with the first spacer 2344 of the first planetary gear assembly. A column gear 23432 is arranged on the planetary carrier of the first planetary gear assembly, which passes through the central through hole of the first mounting plate of the second planetary gear assembly 235, and is meshed with the inner sides of the three planetary gears of the second planetary gear assembly 235. The lower end of the column gear 23432 of the first planetary gear assembly abuts against the spacer of the second planetary gear assembly. A column gear is arranged on the planetary carrier of the second planetary gear assembly, which passes through the central through hole of the first mounting plate of the output stage planetary gear assembly 236, and is meshed with the inner sides of the three planetary gears of the output stage planetary gear assembly 236. The lower end of the column gear of the second planetary gear assembly 235 abuts against the spacer of the output stage planetary gear assembly.

Figure 16:
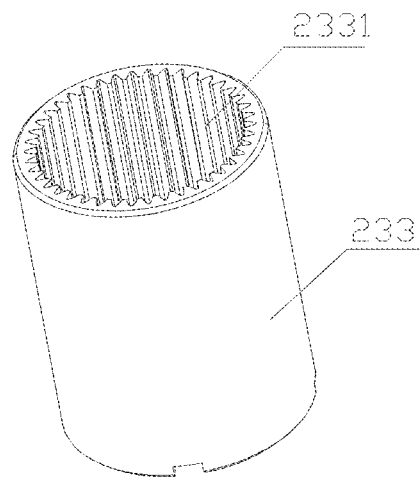
FIG. 16 is a perspective view of a fixed gear in FIG. 13.
Figure 17:
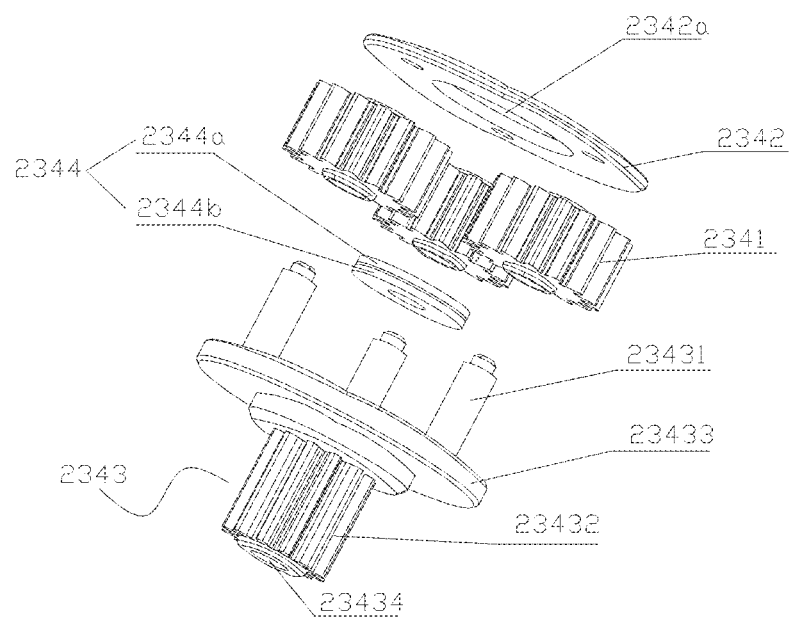
FIG. 17 is an exploded structural diagram of a first planetary gear assembly in FIG. 13.
Figure 18:
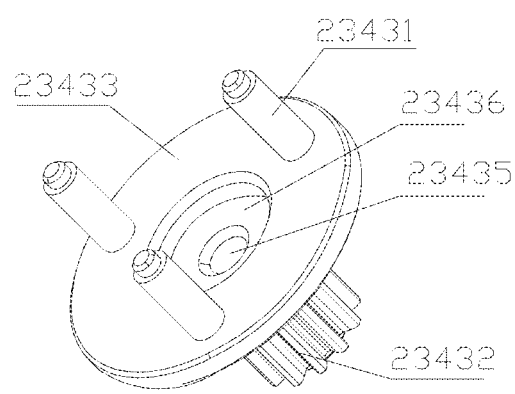
FIG. 18 is a perspective view of an angle of a planetary carrier of the first planetary gear assembly in FIG. 17.

The reduction mechanism further includes a fixed ring gear 233. As shown in FIG. 16, the fixed ring gear 233 has an internal tooth part 2331, and the first planetary gear assembly 234, the second planetary gear assembly 235 and the output stage planetary gear assembly 236 are at least partially placed in the fixed ring gear 233. The outer sides of the planetary gears of the first planetary gear assembly 234, the second planetary gear assembly 235, and the output stage planetary gear assembly 236 are meshed and connected with the inner tooth part 2331. The fixed ring gear 233 is at least partially placed in the rotor assembly 21, which is beneficial to reduce the space of the control device, and is beneficial to the miniaturization of the control device. The lower end of the fixed ring gear 233 is connected to the connecting seat 214 in a limited position, and the outer diameter of the fixed ring gear 233 is smaller than the inner diameter of the rotor 211. There is a gap between the outer surface of the fixed ring gear 233 and the inner surface of the rotor 211, and the rotor 211 can freely rotate relative to the fixed ring gear 233.

The other end of the output shaft 237 is fixedly or limitedly connected to the valve rod 231. In this embodiment, the interface part of the output shaft 237 close to one end of the valve rod 231 is a non-rotating surface, such as a D-shaped interface. The valve rod 231 has a concave portion matched with the interface part, the output shaft 237 is inserted and matched with the valve rod 231, and the valve rod 231 is connected with the valve core ball 3.

Figure 3:
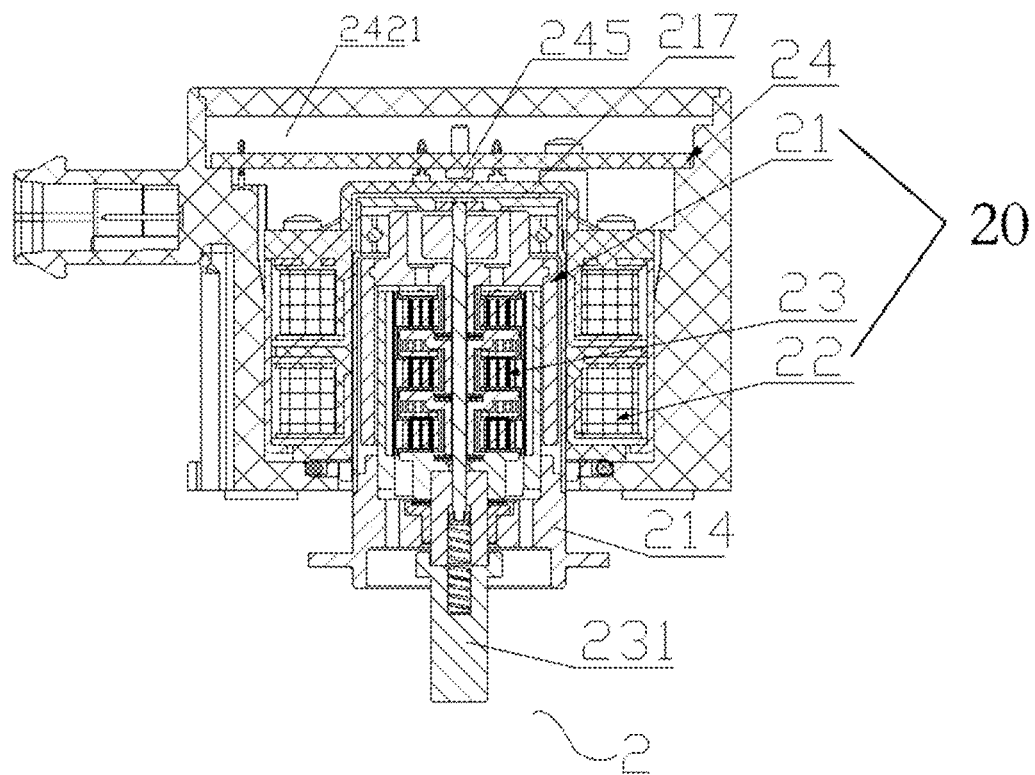
FIG. 3 is a cross-sectional structural diagram of a control device in FIG. 2.
Figure 4:
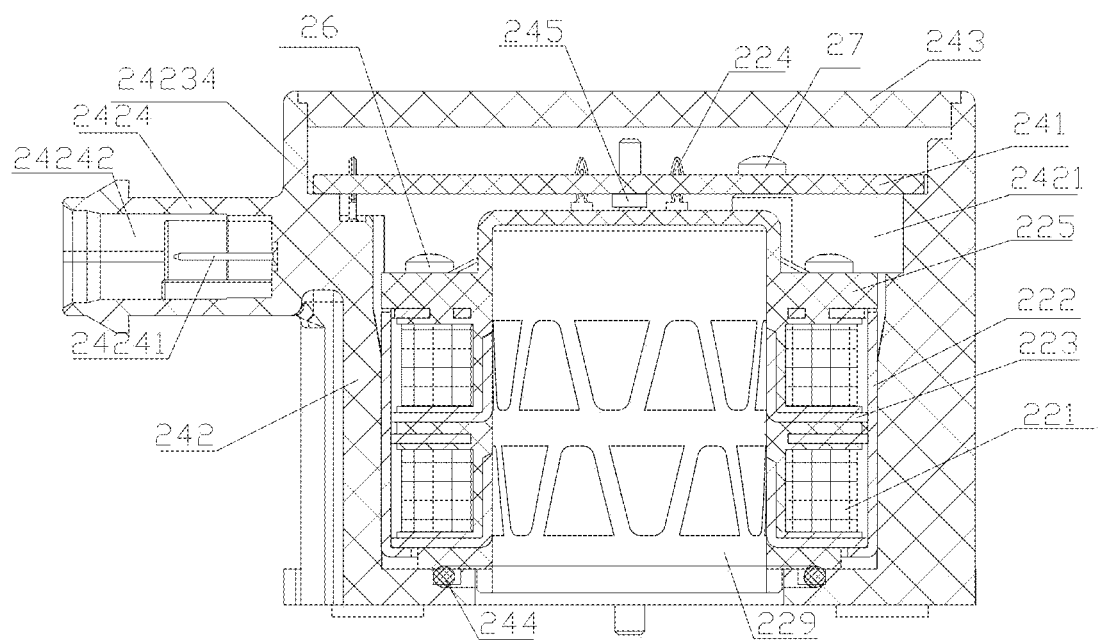
FIG. 4 is a cross-sectional structural diagram of a control part and a stator assembly of the control device in FIG. 2.
Figure 5:
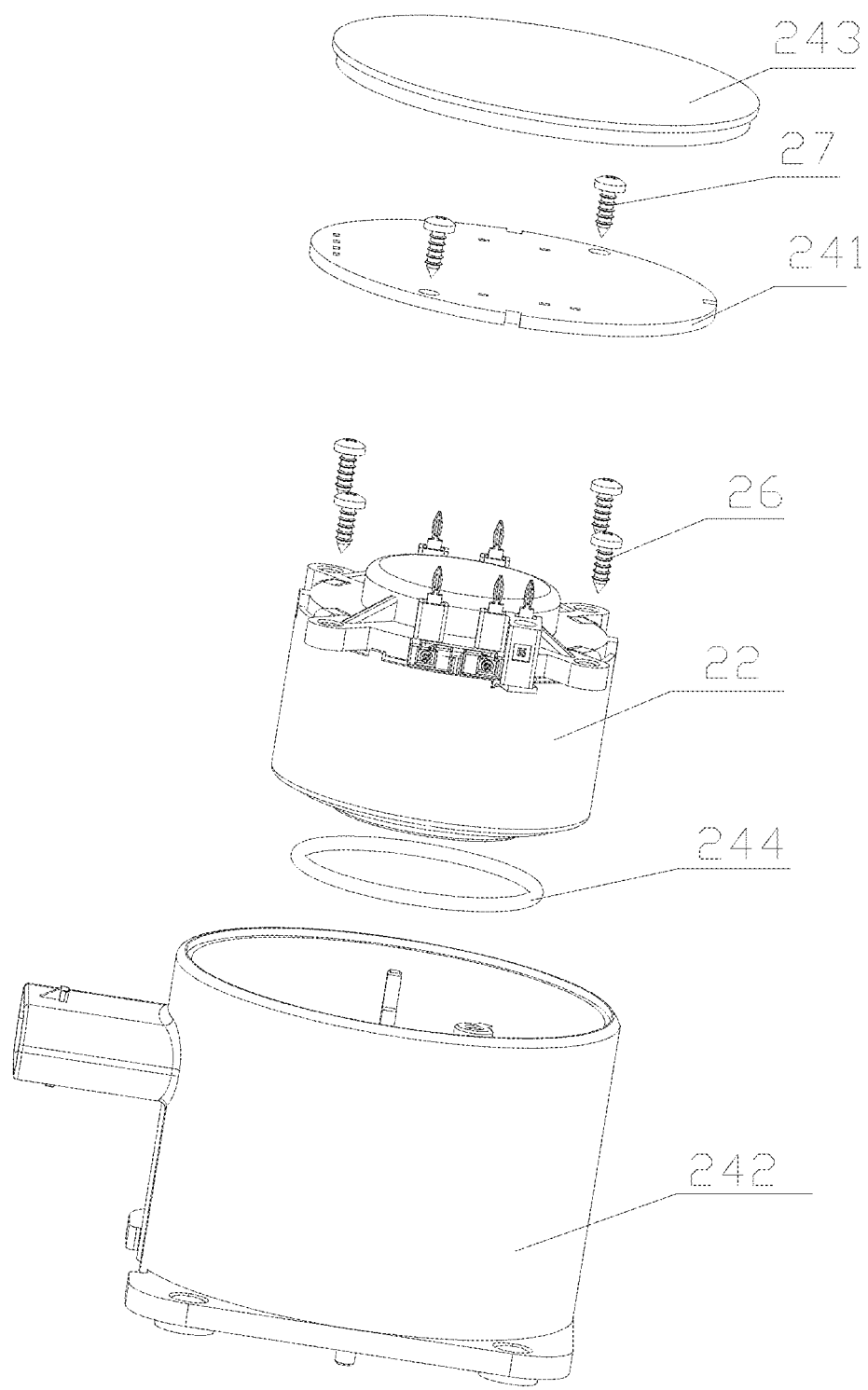
FIG. 5 is an exploded structure schematic diagram of the control part and stator assembly in FIG. 4.

Referring to FIG. 3 and FIG. 13 in combination, the rotor assembly 21 further includes a magnetic ring 217, and the control part 24 further includes a Hall sensor 245. The Hall sensor 245 detects the rotation angle of the shaft by sensing the magnetic field intensity change of the magnetic ring 217. The magnetic ring 217 and the Hall sensor 245, as detection components for detecting the rotation angle of the shaft part, may detect the rotation angle of the shaft part. One end of the shaft part 216 abuts against the end cover 213, and the other end of the shaft part 216 is connected with the connecting bracket 215, passes through the sun gear 232, the first planetary gear assembly 234, the second planetary gear assembly 235, the output stage planetary gear assembly 236, and is connected with the output shaft 237. In order to reduce the rotational friction of the shaft part 216, the shaft part 216 is in clearance fit with the connecting bracket 215, the sun gear 232, the first planetary gear assembly 234, the second planetary gear assembly 235 and the output stage planetary gear assembly 236. The transmission part has a fourth accommodating cavity 238, part of the fourth accommodating cavity 238 is located at the output shaft 237, and part of the fourth accommodating cavity 238 is located in the valve rod 231. The output shaft 237 has a fourth through hole 2371, and the fourth through hole 2371 communicates with the fourth accommodating cavity 238. One end, away from the end cover 213, of the shaft part 216 may pass through the fourth through hole 2371, and part of the shaft part is located in the fourth accommodating cavity 238. The shaft part 216 is connected with the output shaft 237, and the output shaft 237 drives the shaft part 216 to rotate in the circumferential direction.

The magnetic ring 217 is mounted on the radial periphery of the shaft part 216, and is limited or fixedly connected with the shaft part 216, so that the shaft part 216 may drive the magnetic ring 217 to rotate, and the magnetic ring 217 is located at the inner side of the connecting bracket 215. The rotor assembly 21 has a magnetic ring accommodating part 2154, the magnetic ring accommodating part 2154 is located inside the first flange part 2152 of the connecting bracket, and the magnetic ring 217 is located in the magnetic ring accommodating part 2154. There is a certain gap between the upper end surface of the magnetic ring 217 and the end cover 213, and a certain gap between the lower end surface of the magnetic ring 217 and the connecting bracket 215. There is also a certain gap between the outer peripheral surface of the magnetic ring 217 and the inner wall of the first flange part 2152, and the magnetic ring 217 may freely rotate along with the shaft part 216. The material of the magnetic ring 217 can be sintered Ru—Fe—B or other materials such as ferrite. The magnetic ring 217 has at least two different magnetic poles. The Hall sensor 245 is located above the magnetic ring 217 and is electrically and/or signally connected to the circuit board 241. In this embodiment, the Hall sensor 245 is located at one end of the circuit board 241 close to the rotor assembly and is fixedly connected to the circuit board 241. In order to ensure the accuracy of the detection assembly, the distance between the Hall sensor 245 and the magnetic ring 217 should not be too large. In an embodiment, the distance between the Hall sensor 245 and the magnetic ring 217 is 2-4 mm. Because the Hall sensor 245 is arranged at one end of the circuit board 241 near the rotor assembly, the magnetic induction surface of the Hall sensor 245 is arranged near the rotor assembly, and the circuit board 241 is located above the rotor assembly 21, so that the magnetic ring 217 is located at one end of the rotor assembly 21 near the circuit board 241. The Hall sensor 245 is close to the magnetic ring 217. When the magnetic ring 217 rotates with the shaft part 216, the Hall sensor 245 may more accurately detect the magnetic pole change caused by the rotation of the magnetic ring 217, and then feed it back to the circuit board 241. The circuit board 241 may calculate the rotation angle of the magnetic ring 217 with the shaft part 216. The shaft part 216 is driven by the output shaft 237, and the output shaft 237 further drives the valve rod 231 to rotate. The valve rod 231 drives the valve core ball 3 to rotate, so the rotation angle of the valve core ball 3 with the valve rod 231 may also be detected, so as to feedback the position of the valve core ball 3 and improve the control accuracy of the electric ball valve. In addition, the magnetic ring of the electric ball valve is located inside the connecting bracket. The first bearing is located outside the connecting bracket, and the connecting bracket and the rotor are integrated. The inner and outer space of the connecting bracket is used to accommodate the detection magnetic ring and the first bearing, so that the space can be reasonably utilized as much as possible, and the volume of the electric ball valve can be reduced.

The rotor assembly 21 further includes a buffer part, which directly or indirectly abuts against the end of the shaft part. In this embodiment, the buffer part may be a first spring 2181. The rotor assembly 21 further includes a limiting part. In this embodiment, the buffer part indirectly abuts the end of the shaft part through the limiting part, and the limiting part may be a first block 2182. The first spring 2181 and the first block 2182 are located in the fourth accommodating cavity 238. The first block 2182 is connected or fixedly connected to the end of the shaft part 216 in a limited position, and the end of the shaft part 216 refers to the end of the shaft part 216 away from the end cover 213. Specifically, the first block 2182 has a concave part, the end of the shaft part 216 has a convex part, and the concave part cooperates with the convex part to limit the position. One end of the first spring 2181 is located at the cavity bottom of the fourth accommodating cavity 238, and the cavity bottom of the fourth accommodating cavity 238 is located inside the valve rod 231. Therefore, one end of the first spring 2181 is in contact with the valve rod, and the other end of the first spring 2181 is in contact with the first block 2182. Whether the electric ball valve works or not, the first spring 2181 is compressed by the first block 2182 and the valve rod. The first spring 2181 may provide upward elastic force for the shaft part 216, which helps to prevent the shaft part 216 from gradually moving away from the end cover during the rotation process. By setting the buffer part and the limiting part, it is beneficial to reduce the axial movement of the magnetic ring 217 and the shaft part 216 in the rotation process, thus improving the detection accuracy and stability of the detection assembly and the control accuracy of the electric ball valve.

The rotor assembly 21 further includes a first bearing 2191, a second bearing 2192, and a third bearing 2193. In this embodiment, the first bearing 2191 is a rolling bearing, the second bearing 2192 is a sliding bearing, and the third bearing 2193 is another sliding bearing. The rotor assembly 21 further includes a first bearing mounting part 2195. Viewed from the radial direction, the first bearing mounting part 2195 is located between the outer wall of the first flange part 2152 of the connecting bracket and the inner wall of the sleeve 212. Viewed from the axial direction, the first bearing mounting part 2195 is located between the end cover 213 and the connecting bracket 215, the first bearing mounting part 2195 is located between the lower end surface of the end cover 213 and the upper end surface of the rotor 211. The first bearing 2191 is located on the first bearing mounting part 2195, and the first bearing 2191 and the end cover 213 have a certain gap. The outer side wall of the first bearing 2191 is in contact with the inner wall of the sleeve 212. The inner side wall of the first bearing 2191 is in contact with the outer side wall of the first flange part 2152. The lower end surface, close to the inner side wall, of the first bearing 2191 is also in contact with the connecting bracket 215. Specifically, the lower end surface of the inner side wall of the first bearing 2191 is in contact with the protrusions 2155 of the connecting bracket 215, and the first bearing 2191 is in an interference fit with the connecting bracket 215 and the sleeve 212. The first bearing 2191 is in interference fit with the connecting bracket 215 and the sleeve 212, the connecting bracket 215 is connected with the rotor 211 and the sun gear 232, the first bearing 2191 is fixed with the sleeve 212. By providing the first bearing 2191, the coaxiality of the rotor, the sleeve and the sun gear can be improved, the friction of the rotor rotation can be reduced, and the stability and transmission efficiency of the rotor rotation can be improved. In addition, in this technical solution, through the arrangement of the first bearing 2191, the connecting bracket and the sleeve are fixed, so the rotor does not need to be fixed by the shaft part, and it can be separated from the shaft part, and the sun gear may also be separated from the shaft part. The solution is beneficial to eliminate the influence of the stress exerted by the rotor and the transmission parts on the shaft part, improve the service life of the shaft part, improve the detection stability of the detection component, and improve the transmission efficiency of the transmission parts.

Figure 2:
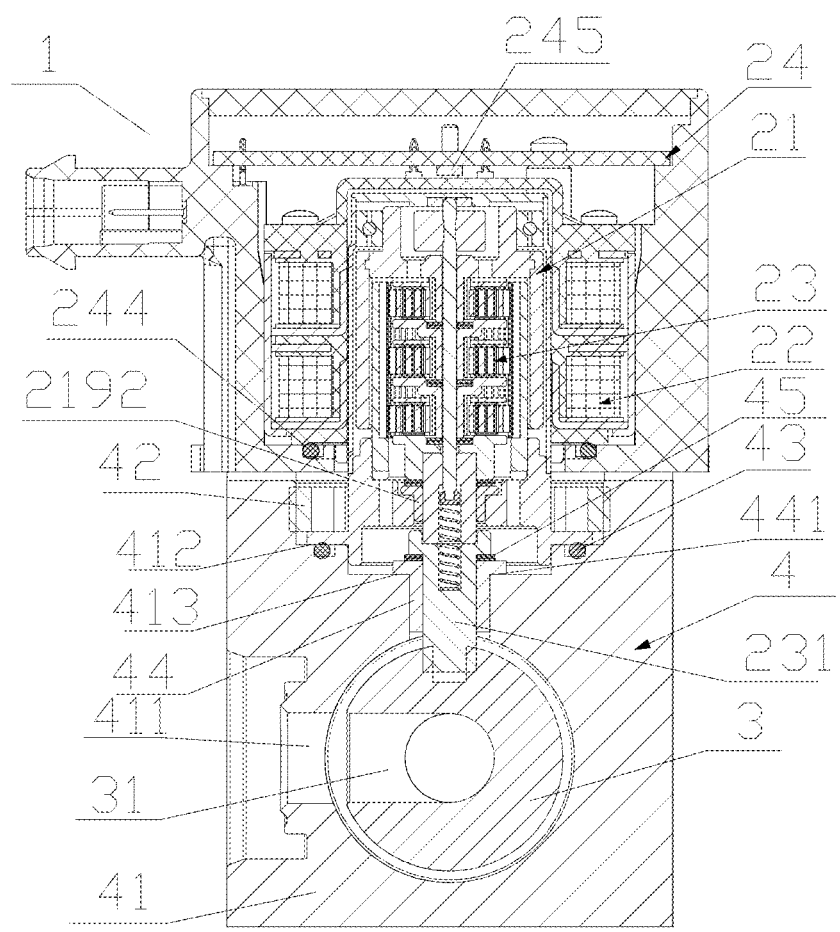
FIG. 2 is a cross-sectional structural diagram of FIG. 1.

Referring to FIG. 2 and FIG. 13 in combination, the second bearing 2192 is mounted on the radial outer circumference of the output shaft 237. The second bearing 2192 is located below the output stage planetary carrier 2363, the second bearing 2192 has a second flange part 2192a. The second flange part 2192a extends outward in the radial direction, the connecting seat 214 has a second stepped part 2141, and the second flange part 2192a abuts against the second stepped part 2141. In addition, the electric ball valve 1 further includes a second spacer 2194. The second spacer 2194 is sleeved on the radial outer circumference of the output shaft 237. The second spacer 2194 may be a single spacer or a combination of two spacers similar to the first spacer 2344. The second spacer 2194 is located between the output stage planetary carrier 2363 and the second flange part 2192a. One end surface of the second spacer 2194 may abut on the lower end surface of the output stage planetary carrier 2363, and the other end surface of the second spacer 2194 may abut on the upper end surface of the second flange part 2192a. The arrangement of the second bearing 2192 and the second spacer 2194 is beneficial to reduce the friction loss during the rotation of the output stage planetary carrier and the output shaft. Of course, the second bearing may not be provided. One end surface of the second spacer 2194 may abut on the lower end surface of the output stage planetary carrier 2363, and the other end surface of the second spacer 2194 may directly abut against the second stepped part 2141. The end cover 213 has a third bearing mounting part 2131. The third bearing 2193 is located at the third bearing mounting part 2131 and is limitedly connected to the end cover 213. The third bearing 2193 is sleeved on the radial outer circumference of the shaft part 216, and is disposed close to the first end 2161 of the shaft part 216. The third bearing 2193 helps to reduce the friction force when the shaft part 216 rotates.

Referring to FIG. 2 and FIG. 13 in combination, the electric ball valve further includes a compression nut 42. The connecting seat 214 is fixedly connected with the valve body 41 through the compression nut 42. The valve body 41 has a third stepped part 412, the connecting seat 214 is at least partially located on the valve body 41, and the connecting seat 214 has a third flange part 2142. The third flange part 2142 extends in the radial direction, and the lower surface of the third flange part 2142 abuts against the third stepped part 412. The compression nut 42 is sleeved on the radial outer circumference of the main body side wall of the connecting seat 214, and the compression nut 42 is in contact with the upper surface of the third flange part 2142. The compression nut 42 is threadedly connected with the valve body 41, so that the connecting seat 214 is fixedly connected with the valve body 41. In order to strengthen the sealing of the electric ball valve, the electric ball valve further includes a second sealing ring 43. The second sealing ring 43 is located between the valve body 41 and the connecting seat 214, specifically between the third flange part 2142 and the third stepped part 412, which is beneficial to prevent the working medium from leaking out.

The electric ball valve further includes a fourth bearing 44 and a third spacer 45. The fourth bearing 44 is mounted on the radial outer circumference of the valve rod 231. The valve body 41 has a fourth stepped part 413, and the fourth stepped part 413 is located below the third stepped part 412. The fourth bearing 44 is specifically a sliding bearing, and has a fourth flange part 441. The fourth flange part 441 abuts against the fourth stepped part 413. The third spacer 45 is mounted on the radial outer circumference of the valve rod 231, and is located between the valve rod 231 and the fourth flange part 441. The third spacer 45 may be a single spacer or a combination of two spacers similar to the first spacer 2344. Of course, the fourth bearing may not be provided. One end surface of the third spacer 45 abuts against the valve rod 231, and the other end surface of the third spacer 45 abuts against the fourth stepped part 413. The connecting seat 214 has a first mounting cavity 2143, and part of the valve rod 231 is located in the first mounting cavity 2143, which is conducive to shortening the axial length of the valve body 41 and miniaturization of the valve body 41. In addition, the first assembly integrates the connecting bracket, the rotor and the sun gear, forms a magnetic ring accommodating part, a transmission part accommodating part and a shaft guide part, and cooperates with the sleeve to form a first bearing mounting part. This design can make reasonable use of space as much as possible, reduce the volume of the electric ball valve, and also help reduce production costs.

The working process of the electric ball valve 1 is as follows: the circuit board 241 controls the stator assembly 22 to generate an excitation magnetic field, and the rotor assembly 21 rotates under the action of the excitation magnetic field. The rotor assembly 21 drives the sun gear 232 to rotate, and the sun gear 232 drives the planetary gear 2341 of the first planetary gear assembly 234 to rotate. While the planetary gear 2341 rotates around its fixed shaft 23431, it also rotates in mesh with the internal tooth portion 2331 of the fixed ring gear 233. A circumferential rotation centered on the sun gear 232 is formed, thereby driving the first mounting plate 2342 and the planetary carrier 2343 to rotate. The column gear 23432 of the planetary carrier 2343 drives the planetary gear of the second planetary gear assembly 235 to rotate. Similarly, the power is transmitted to the output stage planetary carrier 2363 of the output stage planetary gear assembly 236 in turn. The output stage planetary carrier 2363 drives the output shaft 237 to rotate, and the output shaft 237 drives the valve rod 231 to rotate. The valve rod 231 drives the valve core ball 3 to rotate, so that the orifice of the valve core ball 3 communicates or does not communicate with the flow channel or selectively communicates or does not communicate with one of the flow channels, thereby opening or closing or switching the flow path of the electric ball valve or controlling the flow rate of the flow path. In addition, the output shaft 237 also drives the shaft part 216 to rotate. The shaft part 216 and the magnetic ring 217 are limited or fixed, so the magnetic ring 217 also rotates with the shaft part 216, and the rotation angle of the shaft part, that is, the rotation angle of the valve core ball, can be detected by the Hall sensor 245, thus improving the control accuracy of the electric ball valve.

Figure 24:
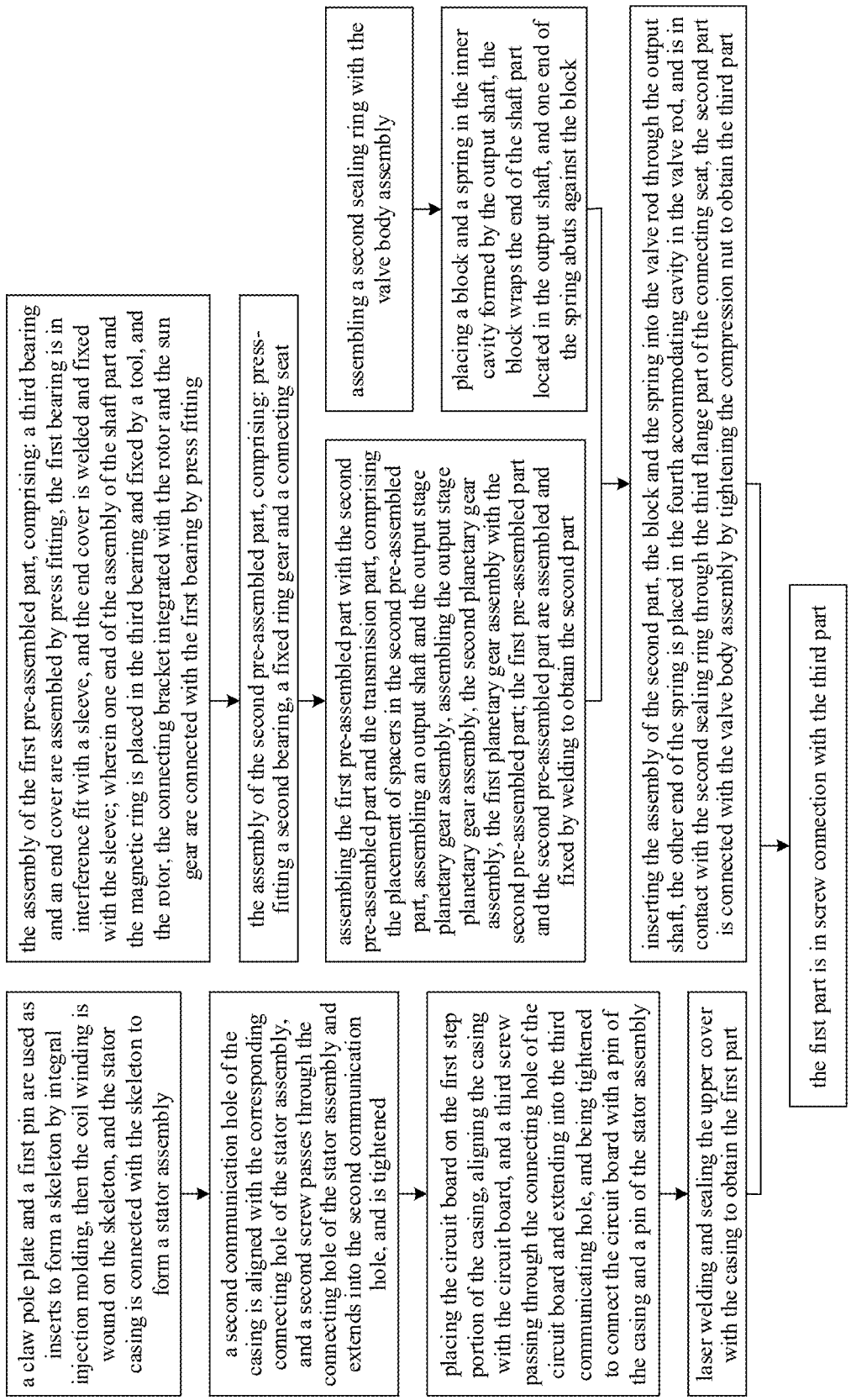
FIG. 24 is a flowchart of a method of manufacturing the electric valve shown in FIG. 1.
Figure 25:
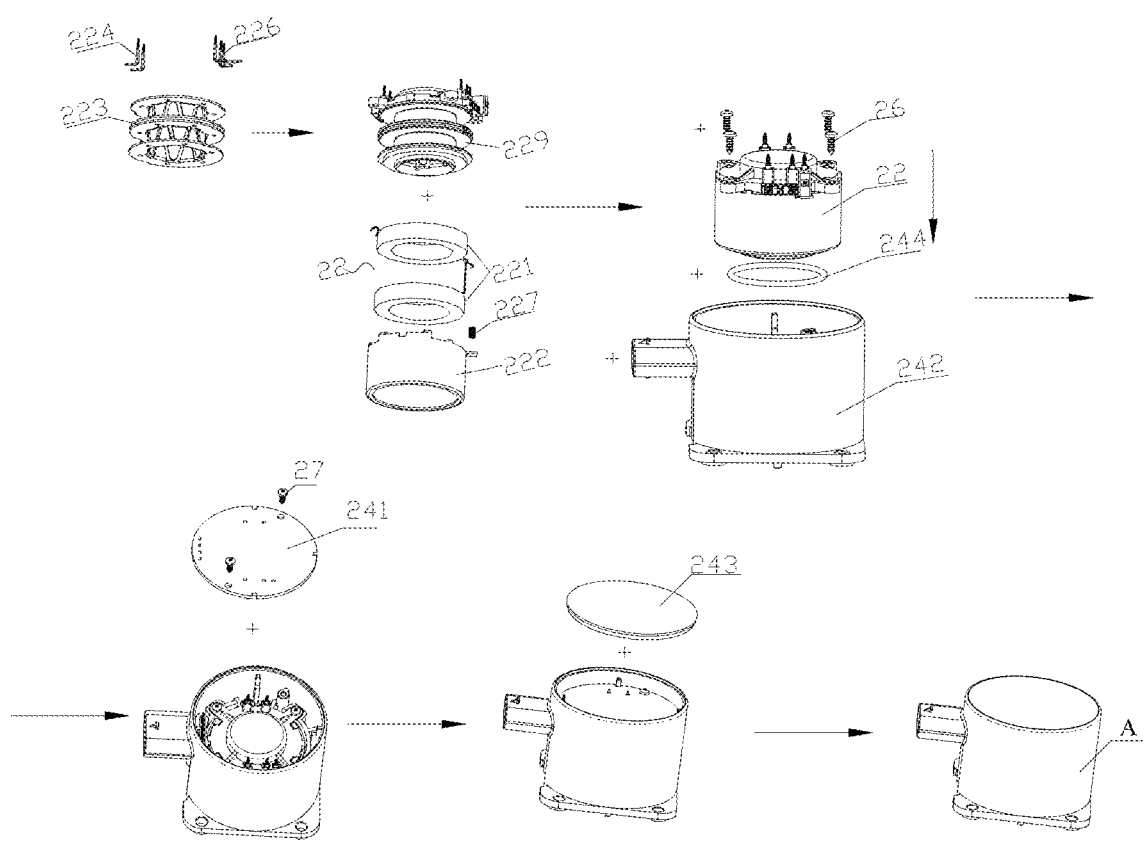
FIG. 25 is a schematic diagram of the assembly steps of the first part shown in FIG. 24.
Figure 26:
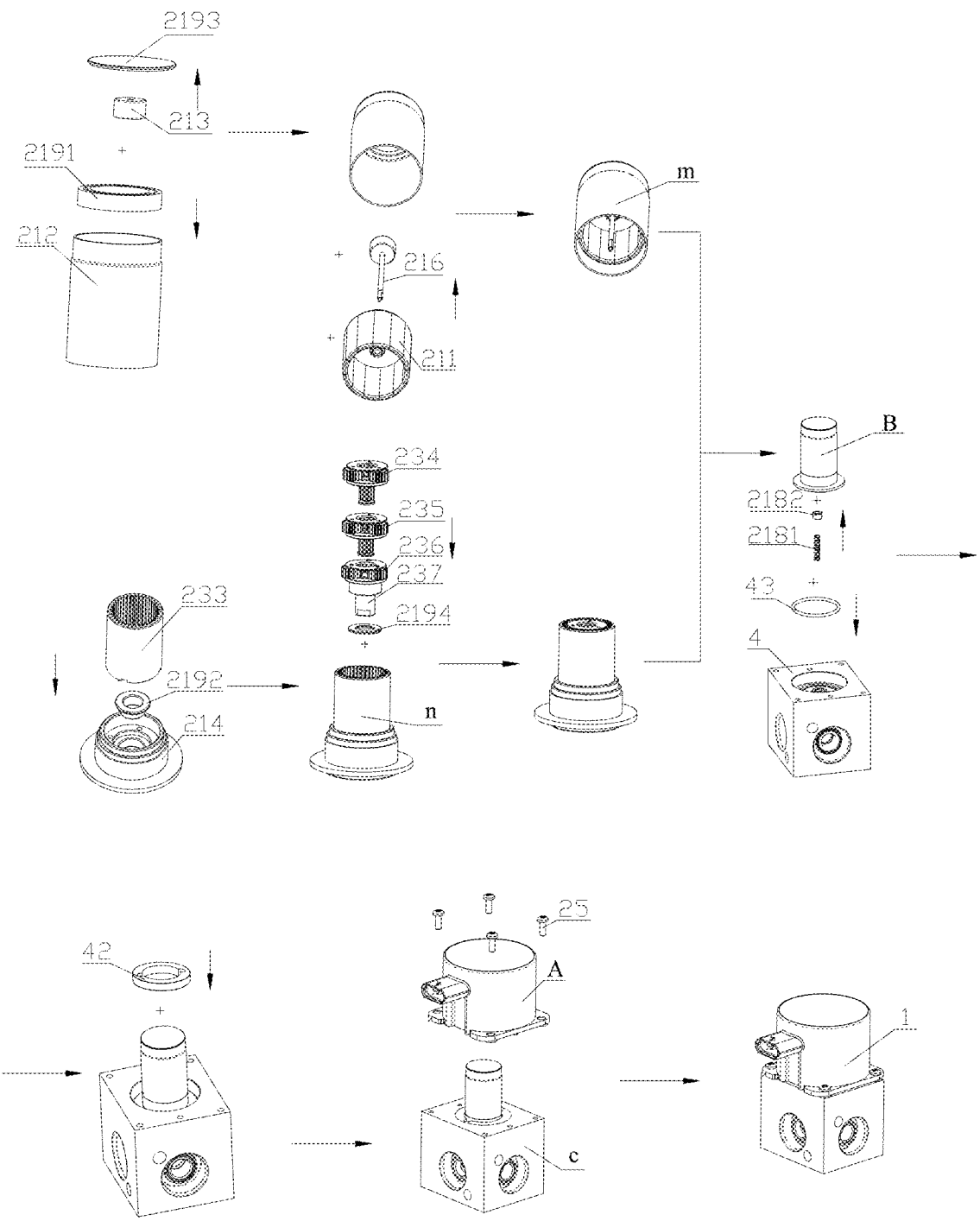
FIG. 26 is a schematic diagram of the assembly steps of the electric valve shown in FIG. 24.

A method for manufacturing an electric valve is further provided according to the technical solution, see FIG. 24 to FIG. 26, including the following steps:

a: the assembly of the first part A, including the matching and assemble of the stator assembly 22 and the control part 24;

b: the assembly of the second part B, including the matching and assemble of the rotor assembly 21 and the transmission part 23;

c: the assembly of the third part C, including the matching and assemble of the second part B with the valve body assembly 4 and the valve core;

d: the connection between the first part A and the third part C.

specifically, the assembly of the first part A includes the following steps:

placing the first sealing ring 244 in the corresponding position of the casing 242, specifically the position of the first sealing mounting groove 24223 described above;

the assembled stator assembly 22 is pressed into the casing 242 and pressed against the first sealing ring 244, and the stator assembly 22 and the casing 242 are connected into a whole by screws; specifically, the casing 242 has a second communication hole 24233, and the stator assembly 22 also has a corresponding connecting hole 228. When the stator assembly 22 is pressed into the casing 242, the second communication hole 24233 should be aligned with the corresponding connecting hole 228 of the stator assembly 22, then the second screw 26 passes through the connecting hole 228 of the stator assembly 22 and extends into the second communication hole 24233, and is tightened and fixed, thus realizing the connection between the stator assembly 22 and the casing 242;

the circuit board 241 is placed on the first step portion 24234. The circuit board 241 is crimped with the pins (the second pin 24241) of the casing 242 and the pins (including the first pin 224 and the third pin 226) of the stator assembly 22, and then connected with the casing 242 by screws. Specifically, the casing 242 has a third communication hole 24235, and the circuit board 241 has a connecting hole corresponding to the third communication hole 24235. The third screw 27 passes through the connecting hole of the circuit board 241, extends into the third communication hole 24235, and then is tightened. The connection between the circuit board 241 and the casing 242 is realized;

the upper cover 243 is connected and sealed with the casing 242. Specifically, it can be realized by laser welding or the like;

the assembly of the stator assembly 22 includes: obtaining the skeleton 229 by integrally injection molding metal pieces (the claw pole plate 223, the first pin 224, the third pin 226, etc. mentioned above) as inserts, then the coil winding 221 is wound around the skeleton 229, and the connecting piece 227 is placed in the corresponding position of the skeleton 229 to make it abut against the third pin 226. Then, the stator casing 222 and the skeleton 229 are connected by snaps or other means. If the stator assembly 22 does not have the third pin and connecting piece, the assembly process for the stator casing and the skeleton can be reduced accordingly.

the assembly of the second part B includes the following steps:

the assembly of the first pre-assembled part m, which includes: the third bearing 2193 and the end cover 213 are assembled by press fitting, the first bearing 2191 is in interference fit with the sleeve 212, and the end cover 213 is welded and fixed with the sleeve 212; one end of the assembly of the shaft part 216 and the magnetic ring 217 is placed in the third bearing 2193. Specifically, the first end 2161 of the shaft part 216 is placed in the third bearing 2193 and fixed by a tool, and then the rotor 211, the connecting bracket 215 and the sun gear 232 integrated with the rotor are connected with the first bearing 2191 by press fitting;

the assembly of the second pre-assembled part n, including press-fitting the second bearing 2192, the fixed ring gear 233 and the connecting seat 214;

the assembly of the first pre-assembled part m with the second pre-assembled part n and the transmission part 23, which may include: a second spacer 2194 is placed in the second pre-assembled part n, and the output shaft 237 is assembled with the output stage planetary gear assembly 236. Assemble the output stage planetary gear assembly 236, the second planetary gear assembly 235, the first planetary gear assembly 234 with the second pre-assembled part; then the first pre-assembled part m and the second pre-assembled part n are assembled and fixed by welding, specifically, the joint between the sleeve and the connecting seat 214 is fixed by welding.

in the assembly of the second part B, the assembly of the first pre-assembled part m and the assembly of the second pre-assembled part n are in no particular order and may be performed simultaneously.

the assembly of the third part C includes:

assembling the second sealing ring 43 with the valve body assembly 4;

placing the first block 2182 and the first spring 2181 in the inner cavity formed by the output shaft, the first block 2182 wraps the end of the shaft part 216 located in the output shaft 237, and one end of the first spring 2181 abuts against the first block 2182; of course, in this step, the first spring 2181 may also be put into the fourth accommodating cavity 238 of the valve rod 231, and the first block 2182 is placed in the cavity of the output shaft 237 and wraps the end of the shaft part 216;

the assembly of the second part B, the first block 2182 and the first spring 2181 is inserted into the valve rod 231 through the output shaft 237. The other end of the first spring 2181 is placed in the fourth accommodating cavity 238 in the valve rod 231, and is in contact with the second sealing ring 43 through the third flange part 2142 of the connecting seat. The second part B is connected with the valve body assembly 4 by tightening the compression nut 42;

assembling the valve rod with the valve core, the fourth bearing, the third spacer and the valve body assembly; including assembling the fourth bearing and the valve body, then placing the third spacer on the end face of the fourth bearing, assembling the valve rod and the valve body, and connecting the valve rod and the valve core by plugging;

the connection between the first part A and the third part C, which includes: pressing the first part A from the top of the third part C, and connecting them into a whole by screws. The rotor assembly 21 is at least partially located at the inner circumference of the stator assembly 22, aligned with the first communication hole 24222 of the casing 242, the screw hole reserved in the valve body assembly 4 and the positioning post. The first screw 25 is screwed in to connect the first part with the third part.

According to the above manufacturing method, the stator assembly 22 and the control part are assembled to obtain the first part A, the rotor assembly and the transmission part are assembled to obtain the second part B, and then the second part B is assembled with the valve body assembly and the valve core to obtain the third part C. The first part A and the third part C are connected by threads, and the first part A and the second part B can be assembled separately, which is beneficial to optimizing the assembly process and reducing the production cost.

Figure 21:
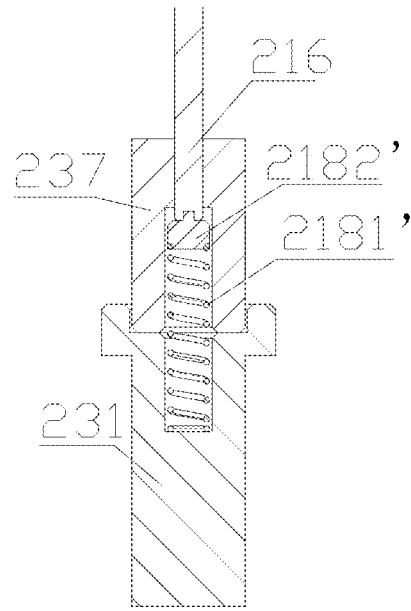
FIG. 21 is a partial cross-sectional structural schematic diagram of the second embodiment in which the shaft part cooperates with the buffer part and the limiting part.

Referring to FIG. 21, FIG. 21 is another embodiment in which the shaft part 216 of this technical solution is matched with the buffer part and the limiting part. The main difference from the technical solution shown in FIG. 13 is that, in this embodiment, the end of the shaft part 216 has a concave part, and the corresponding limiting part is specifically the second block 2182'. The second block 2182' has a convex part, and the concave part cooperates with the convex part to limit the position. In this embodiment, the buffer part is a second spring 2181', and the second spring 2181' is in contact with the second block 2182'.

Figure 11:
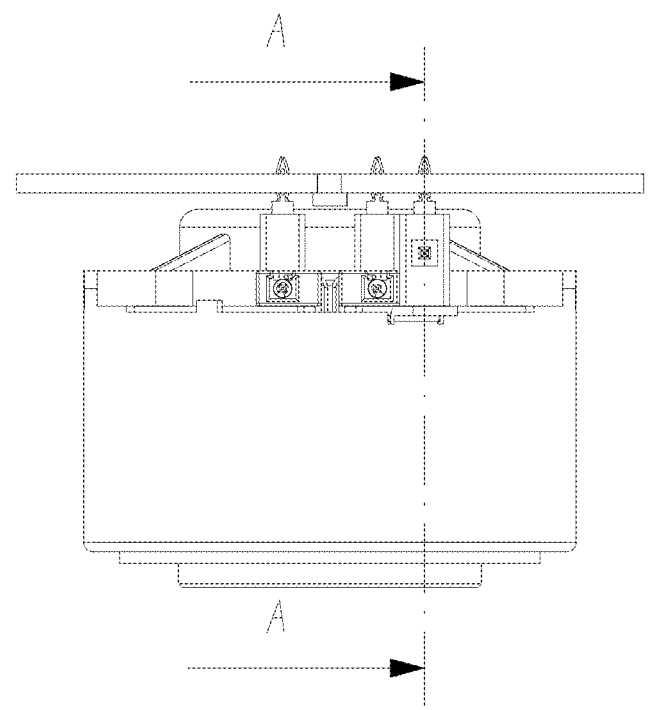
FIG. 11 is a schematic front view of the combination of the stator assembly and the circuit board.
Figure 12:
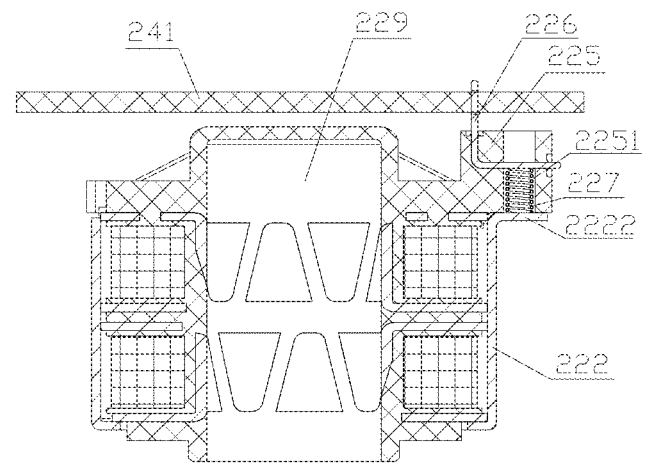
FIG. 12 is a cross-sectional structural diagram of the combined structure in FIG. 11 along the A-A direction.
Figure 22:
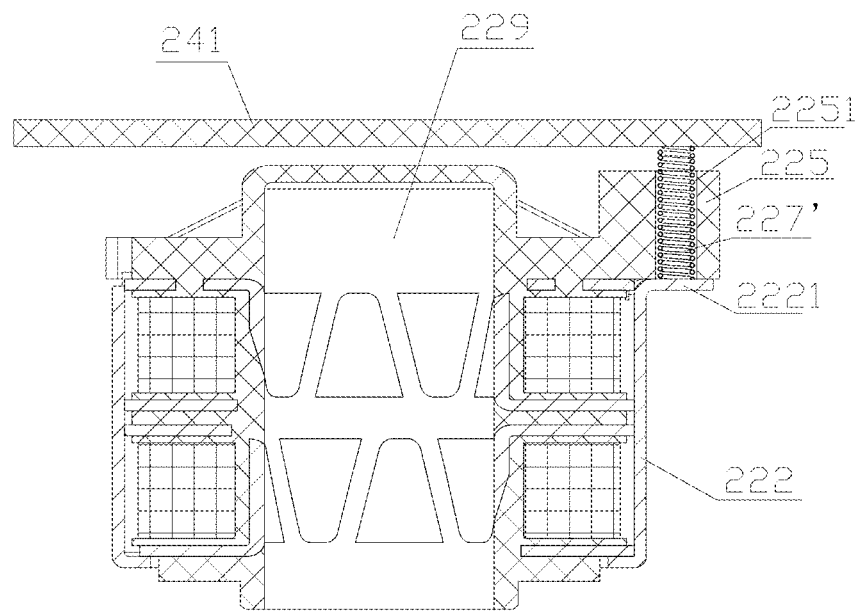
FIG. 22 is a cross-sectional structural schematic diagram of the second embodiment of the combination of the stator assembly and the circuit board.

Referring to FIG. 22, FIG. 22 is the second embodiment of the stator assembly and the circuit board of the technical solution. The main difference from the technical solution shown in FIG. 11 is that, in this embodiment, the second pin is not provided. One end of the connecting piece 227' is in contact with the circuit board 241 and can be electrically connected, and the other end of the connecting piece 227' is in contact with the stator casing 222 and can be electrically connected. Specifically, the connecting piece 227' is an elastic element, which is a first spring in this embodiment. One end of the first spring is in contact with the mating part of the stator casing and can be electrically connected, and the injection part 225 has a mounting part 2251. The mounting part 2251 is limitedly connected or fixedly connected with the mating part. One end of the first spring close to the stator casing is at least partially located at the mounting part 2251, and the first spring is limited in movement by the mounting part 2251. The other end of the first spring protrudes from the mounting part 2251, and the first spring protruding from the injection part abuts against the circuit board 241 and is conductively connected to the ground layer of the circuit board. The first spring is compressed by the circuit board and the stator casing. Through the first spring, the stator casing 222 and the circuit board 241 can be conductively connected. When there is external electromagnetic interference, the electromagnetic force acting on the surface of the stator casing 222 can be guided from the connecting piece 227 to the grounding layer of the circuit board 241, and then connected to the grounding terminal through the grounding layer to realize the grounding function, which is beneficial to reduce the external electromagnetic interference.

It can be understood that, similar to FIG. 22, the connecting piece may also be the first elastic sheet. One end of the first elastic sheet is in contact with the stator casing and can be electrically connected. The other end of the first elastic sheet is directly in contact with the circuit board and is conductively connected with the ground layer of the circuit board. The mounting part is limitedly connected or fixedly connected with the stator casing. Part of the first elastic sheet is located at the mounting part, and part of the first elastic sheet extends out of the mounting part. The first elastic sheet extending out of the mounting part is in contact with the circuit board. The first elastic sheet is limited and bent by the circuit board and the stator casing. The middle part of the first elastic sheet is bent with an arc, and the middle part of the first elastic sheet is in contact with the mounting part.

Figure 23:
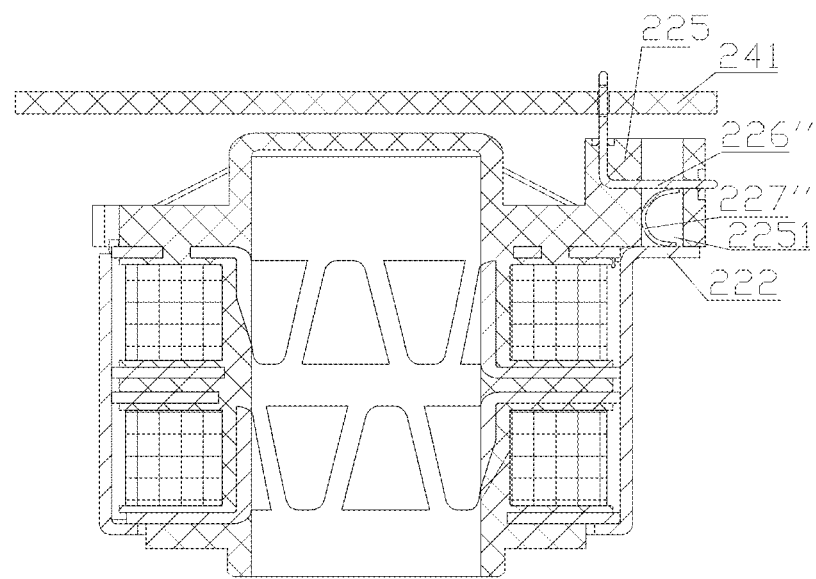
FIG. 23 is a cross-sectional structural schematic diagram of the third embodiment of the combination of the stator assembly and the circuit board.

Referring to FIG. 23, FIG. 23 is the third embodiment of the stator assembly and the circuit board of the technical solution, the main difference from the technical solution shown in FIG. 7 is that in this embodiment, the connecting piece 227" is specifically a second elastic sheet. One end of the second elastic sheet is in contact with the stator casing 222 and can be electrically connected. The other end of the second elastic sheet is in contact with the third pin 226" and can be conductively connected. The third pin 226" is conductively connected to the ground layer of the circuit board 241. Here, the third pin 226" is only to be distinguished from the aforementioned second pin, "the second" and "the third" have no special meaning.

It should be noted that, the above embodiments are only intended to illustrate the present disclosure and not to limit the technical solutions described in the present disclosure. Although the present specification has been described in detail with reference to the embodiments described above, it should be understood by those skilled in the art that, various modifications and equivalents can be made to the technical solutions of the present disclosure without departing from the spirit and scope of the present disclosure, all of which should be contained within the scope of the claims of the present disclosure.

The invention claimed is:

1. An electric ball valve, comprising a driving part, a transmission part, a valve core ball and a valve body, wherein the valve core ball is accommodated in an inner cavity formed by the valve body, the valve core ball has an inner channel, the driving part is in transmission connection with the transmission part, the valve body is provided with at least two flow channels for communicating with an outside, the transmission part drives the valve core ball to move, and the inner channel of the valve core ball is configured to allow the at least two flow channels in communication or not in communication or selectively allow one of the flow channels in communication or not in communication, the electric ball valve comprises a magnetic ring and a Hall sensor, the driving part comprises a rotor assembly, and the rotor assembly comprises a shaft part, the transmission part comprises an output shaft and a valve rod, and the shaft part is in transmission connection with the output shaft, the output shaft drives the shaft part to rotate in the circumferential direction, the magnetic ring is mounted on a radial outer circumference of the shaft part, and the electric ball valve further comprises a buffer part, and the buffer part and an end of the shaft part are in direct or indirect contact; and the output shaft is fixedly connected or limitedly connected to the valve rod, and the valve rod is in transmission connection with the valve core ball.

2. The electric ball valve according to claim 1, wherein the rotor assembly comprises an end cover, a sleeve and a rotor, the sleeve is fixedly connected with the end cover, the rotor is located on the inner circumference of the sleeve, and one end of the shaft part is in contact with the end cover, the electric ball valve further comprises a limiting part, the limiting part and the shaft part are limited at the end, away from the end cover, of the end cover, and the buffer part is in contact with the limiting part, the shaft part is rotatable with the output shaft, and the magnetic ring rotatable with the shaft part.

3. The electric ball valve according to claim 2, wherein the transmission part is provided with a fourth accommodating cavity, part of the fourth accommodating cavity is located on the output shaft, and part of the fourth accommodating cavity is located in the valve rod, at least part of the limiting part and the buffer part are located in the fourth accommodating cavity, and the buffer part is in contact with the valve rod, the output shaft has a fourth through hole, and the fourth through hole communicates with the fourth accommodating cavity, the end, away from the end cover, of the shaft part passes through the fourth through hole and is located in the fourth accommodating cavity.

4. The electric ball valve according to claim 3, wherein the electric ball valve comprises a circuit board, and the circuit board is located above the rotor assembly; the Hall sensor is located at one end, close to the rotor assembly, of the circuit board, and the Hall sensor is in electric or signal connection to the circuit board; and a sensing surface of the Hall sensor is arranged close to the rotor assembly, the magnetic ring is mounted outside one end, close to the rotor assembly, of the shaft part, and the Hall sensor is located above the magnetic ring.

5. The electric ball valve according to claim 4, wherein the limiting part comprises a first block, and the first block has a concave part, an end, away from the end cover, of the shaft part has a convex part, and the concave part is matched with the convex part, the buffer part comprises a first spring, one end of the first spring is in contact with the first block, the other end of the first spring is in contact with the valve rod, and the first spring is compressed by the first block and the valve rod.

6. The electric ball valve according to claim 4, wherein the electric ball valve comprises a casing and an upper cover, and the casing and the upper cover are sealed and fixedly connected to form a control cavity, the driving part comprises a stator assembly, the stator assembly is located on the inner circumference of the casing and is connected with the casing through threads, the circuit board is arranged close to the upper cover, and the circuit board and the casing are connected by screws, the stator assembly has a first pin, and the circuit board is crimped and fixed with the first pin and is electrically connectable, and the circuit board is in electric and signal connection with the stator assembly through the first pins.

7. The electric ball valve according to claim 6, wherein the stator assembly comprises a stator casing and coil winding, the coil winding is located inside the stator casing and is electrically connected to the circuit board, the rotor assembly is located on the inner circumference or the outer circumference of the stator assembly, the electric ball valve further comprises a connecting piece, the connecting piece is in contact with the stator casing and can be electrically connected, the connecting piece directly or indirectly contacts the circuit board and is conductively connected to the ground layer of the circuit board; the stator assembly has a mounting part formed by injection molding, the mounting part is fixed with the stator casing, and the connecting piece is partially located at the mounting part.

8. The electric ball valve according to claim 7, wherein the connecting piece comprises a first spring, one end of the first spring is in contact with the stator casing and is electrically connectable, the other end of the first spring is in contact with the circuit board and is conductively connected to the ground layer of the circuit board, the mounting part is connected or fixedly connected with the stator casing, part of the first spring is positioned at the mounting part, part of the first spring extends out of the mounting part, the first spring protruding out of the mounting part is in contact with the circuit board, the first spring is compressed by the circuit board and the stator casing;

or, the connecting piece comprises a first elastic sheet, one end of the first elastic sheet is in contact with the stator casing and is electrically connectable, the other end of the first elastic sheet is in contact with the circuit board and is conductively connected to the ground layer of the circuit board, the mounting part is connected or fixedly connected with the stator casing, part of the first elastic sheet is positioned at the mounting part, part of the first elastic sheet extends out of the mounting part, the first elastic sheet protruding out of the mounting part is in contact with the circuit board, and the first elastic sheet is limited and bent by the circuit board and the stator casing;

or, the electric ball valve further comprises a second pin, the connecting piece comprises a second spring, and the circuit board has a socket, the second pin is fixed with the stator assembly by injection molding, and the second pin partially extends out of the injection part, the second pin and the socket are fixed by pressing or welding, the second pin is conductively connected to the ground layer of the circuit board, and the second pin is partially located in the mounting part, the mounting part is connected or fixedly connected with the stator casing, the second spring is located at the mounting part, one end of the second spring is in contact with the part of the second pin located in the mounting part, the other end of the second spring is in contact with the stator casing;

or, the electric ball valve further comprises a third pin, the connecting piece comprises a second elastic sheet, and the circuit board has a socket, the third pin is fixed with the stator assembly by injection molding, and the third pin partially extends out of the injection part, the third pin and the socket are fixed by pressing or welding, the third pin is conductively connected to the ground layer of the circuit board, the third pin is partially located at the mounting part, the mounting part is connected or fixedly connected with the stator casing, the second elastic sheet is located at the mounting part, one end of the second elastic sheet is in contact with the part of the third pin located in the mounting part, the other end of the second elastic sheet is in contact with the stator casing.

9. The electric ball valve according to claim 4, wherein the limiting part comprises a second block, and the second block has a convex part, an end, away from the end cover, of the shaft part has a concave part, and the concave part is matched with the convex part, the buffer part comprises a second spring, one end of the second spring is in contact with the second block, and the other end of the second spring is in contact with the valve rod, and the second spring is compressed by the second block and the valve rod.

10. The electric ball valve according to claim 2, wherein the rotor assembly comprises a connecting bracket, and the rotor is integral with the connecting bracket, the electric ball valve further comprises a first bearing, and the connecting bracket comprises a connecting part and a first flange part, the rotor is connected to the connecting bracket as a whole through the connecting part, and the free end of the first flange part is arranged close to the end cover, a fixed end of the first flange part is connected to the connecting part, the magnetic ring is located inside the first flange part, and the first bearing is located outside the first flange part.

11. The electric ball valve according to claim 10, wherein the rotor assembly has a magnetic ring accommodating part, a first bearing mounting part and a transmission part accommodating part, the magnetic ring accommodating part is located between the end cover and the connecting bracket and is located inside the first flange part, the first bearing mounting part is located between the end cover and the connecting bracket, and between the outer side wall of the first flange part and the inner wall of the sleeve, the transmission part accommodating part is located on the inner circumference of the rotor, the magnetic ring is located in the magnetic ring accommodating part, the first bearing is located at the first bearing mounting part, and the transmission part is at least partially located at the transmission part accommodating part.

12. The electric ball valve according to claim 11, wherein the transmission part comprises a sun gear, the sun gear is connected with the connecting bracket and is opposite to an extending direction of the first flange part, the sun gear is integrally formed with the connecting bracket and the rotor, and the sun gear is located in the transmission part accommodating part, the electric ball valve further comprises a shaft guide part, and the shaft guide part comprises a first guide part and a second guide part, the first guide part is located on the connecting bracket, the second guide part is located on the sun gear, the first guide part and the second guide part are coaxially arranged, and the shaft part is partially located on the shaft guide part and is in clearance fit with the shaft guide part.

13. The electric ball valve according to claim 12, wherein the first bearing comprises a rolling bearing, and the first bearing abuts between the outer wall of the first flange part and the inner wall of the sleeve, a lower end, close to the inner side wall, of the first bearing is in contact with the connecting bracket, the first bearing is located above the rotor, a fixed part of the first bearing is in interference fit with the sleeve, and a rotating part of the first bearing is in interference fit with the connecting bracket; the end cover has a third bearing mounting part, and the electric ball valve comprises a third bearing, the third bearing is mounted on the radial outer circumference of the shaft part, the third bearing is located at the third bearing mounting part and is connected with the end cover in a limited position; and one end, close to the end cover, of the shaft part has an arc.

14. A method for manufacturing the electric ball valve according to claim 1, comprising following steps:
assemble of a first part, comprising matching and assemble of a stator assembly and a control part, wherein the assembled stator assembly is pressed into a casing of the control part, and the stator assembly and the casing are connected as a whole through screw connection, a circuit board is placed in the casing and crimped with the pins of the casing and the pins of the stator assembly, the circuit board is connected with the casing through threaded connection, and an upper cover is hermetically connected with the casing;

assembly of a second part, comprising matching and assemble of a rotor assembly and a transmission part;

assembly of a third part, comprising matching and assemble of the second part with a valve body assembly and the valve core, wherein the valve body assembly and the valve core are assembled, the second part is connected with the valve core and the second part is fixedly connected with the valve body assembly;

wherein the first part is in screw connection with the third part.

15. The method according to claim 14, wherein in the assembly of the first part, the step of pressing the assembled stator assembly into the casing of the control part comprises:

a claw pole plate and a first pin are used as inserts to form a skeleton by integral injection molding, then the coil winding is wound on the skeleton, and the stator casing is connected with the skeleton to form a stator assembly, a second communication hole of the casing is aligned with the corresponding connecting hole of the stator assembly, a second screw passes through the connecting hole of the stator assembly and extends into the second communication hole, and is tightened to connect the stator assembly with the casing;

wherein the step of placing the circuit board in the casing comprises: placing the circuit board on the first step portion of the casing, aligning the third communication hole of the casing with the corresponding connecting hole of the circuit board, and a third screw passes through the connecting hole of the circuit board and extends into the third communicating hole, and is tightened to connect the circuit board with the casing;

wherein the step of sealing and connecting the upper cover with the casing comprises laser welding and sealing the upper cover with the casing;

wherein the assembly of the second part comprises:

the assembly of the first pre-assembled part, comprising: a third bearing and an end cover are assembled by press fitting, the first bearing is in interference fit with a sleeve, and the end cover is welded and fixed with the sleeve; wherein one end of the assembly of the shaft part and the magnetic ring is placed in the third bearing and fixed by a tool, and the rotor, the connecting bracket integrated with the rotor and the sun gear are connected with the first bearing by press fitting;

the assembly of the second pre-assembled part, comprising: press-fitting a second bearing, a fixed ring gear and a connecting seat;

assembling the first pre-assembled part with the second pre-assembled part and the transmission part, comprising the placement of spacers in the second pre-assembled part, assembling an output shaft and the output stage planetary gear assembly, assembling the output stage planetary gear assembly, the second planetary gear assembly, the first planetary gear assembly with the second pre-assembled part; the first pre-assembled part and the second pre-assembled part are assembled and fixed by welding.

16. The method according to claim 14, wherein the assembly of the third part comprises:

assembling a second sealing ring with the valve body assembly;

placing a block and a spring in the inner cavity formed by the output shaft, the block wraps the end of the shaft part located in the output shaft, and one end of the spring abuts against the block;

inserting the assembly of the second part, the block and the spring into the valve rod through the output shaft, the other end of the spring is placed in the fourth accommodating cavity in the valve rod, and is in contact with the second sealing ring through the third flange part of the connecting seat, the second part is connected with the valve body assembly by tightening the compression nut;

or, the assembly of the third part comprises:

assembling the second sealing ring with the valve body assembly;

putting the spring into the fourth accommodating cavity of the valve rod, and placing the block in the inner cavity of the output shaft and wrap the end of the shaft part;

inserting the assembly of the second part, the block and the spring into the valve rod through the output shaft, the other end of the spring is placed in the fourth accommodating cavity in the valve rod, and is in contact with the second sealing ring through the third flange part of the connecting seat, wherein the second part is connected with the valve body assembly by tightening the compression nut.

* * * * *